United States Patent
Itou et al.

(10) Patent No.: US 11,684,070 B2
(45) Date of Patent: Jun. 27, 2023

(54) BENDING MECHANISM, BENDING METHOD, AND FOOD MANUFACTURING METHOD

(71) Applicant: NICHIREI FOODS INC., Tokyo-to (JP)

(72) Inventors: Ryuichi Itou, Chiba (JP); Masahiko Honda, Chiba (JP); Suguru Hirayama, Chiba (JP); Toru Iwasa, Chiba (JP); Minoru Mamiya, Chiba (JP)

(73) Assignee: NICHIREI FOODS INC., Tokyo-to (JP)

( * ) Notice: Subject to any disclaimer, the term of this patent is extended or adjusted under 35 U.S.C. 154(b) by 21 days.

(21) Appl. No.: 17/271,946

(22) PCT Filed: Aug. 26, 2019

(86) PCT No.: PCT/JP2019/033380
§ 371 (c)(1),
(2) Date: Feb. 26, 2021

(87) PCT Pub. No.: WO2020/045369
PCT Pub. Date: Mar. 5, 2020

(65) Prior Publication Data
US 2021/0315217 A1  Oct. 14, 2021

(30) Foreign Application Priority Data

Aug. 31, 2018 (JP) .................. 2018-163913

(51) Int. Cl.
*A21C 9/06* (2006.01)
*A23P 20/20* (2016.01)

(52) U.S. Cl.
CPC ............. *A21C 9/063* (2013.01); *A23P 20/20* (2016.08)

(58) Field of Classification Search
CPC ........... A23P 20/20; A23P 20/25; A21C 9/063
(Continued)

(56) References Cited

U.S. PATENT DOCUMENTS 4,313,719 A * 2/1982 Lundgren ............. A21C 3/065
426/94
4,516,487 A   5/1985 Madison et al.
(Continued)

FOREIGN PATENT DOCUMENTS

CN          1496684 A      5/2004
CN       203851707 U      10/2014
(Continued)

OTHER PUBLICATIONS

International Preliminary Report on Patentability and English translation of the Written Opinion of the International Searching Authority, dated Mar. 11, 2021, for International Application No. PCT/JP2019/033380.
(Continued)

*Primary Examiner* — Reginald Alexander
(74) *Attorney, Agent, or Firm* — Birch, Stewart, Kolasch & Birch, LLP

(57) ABSTRACT

A bending mechanism, a bending method and a food manufacturing method which are capable of bending a sheet-shaped flexible food material, such as a skin, with high accuracy and high speed are provided. A conveyance unit 11 conveys a flexible food material 81. A support unit 12 supports a bending reference portion 85 being a part of the flexible food material 81 in at least a part of a section while the flexible food material 81 is conveyed from a first conveyance area A1 to a second conveyance area A2. The conveyance unit 11 includes a first component part 21 and a second component part 22. An angle formed by a support portion of the second component part 22 which makes
(Continued)

contact with a bending portion 87 with respect to a support portion of the first component part 21 which makes contact with a base portion 86 continuously changes from the first conveyance area A1 toward the second conveyance area A2 in such a manner that an angle of the bending portion 87 with respect to the base portion 86 in the second conveyance area A2 is larger than an angle of the bending portion 87 with respect to the base portion 86 in the first conveyance area A1.

5 Claims, 16 Drawing Sheets

(58) Field of Classification Search
USPC ............................................. 99/450.2, 450.6
See application file for complete search history.

(56) References Cited

U.S. PATENT DOCUMENTS

| | | | | |
|---|---|---|---|---|
| 4,638,729 | A * | 1/1987 | Woodwarth | A21C 9/063 |
| | | | | 99/450.2 |
| 4,913,043 | A * | 4/1990 | Cheung | A21C 9/063 |
| | | | | 425/363 |
| 6,170,391 | B1 * | 1/2001 | Pomara, Jr. | A21C 9/063 |
| | | | | 99/450.2 |
| 8,505,445 | B2 | 8/2013 | Robert | |

FOREIGN PATENT DOCUMENTS

| | | |
|---|---|---|
| CN | 107361095 A | 11/2017 |
| JP | 50-157578 A | 12/1975 |
| JP | 62-181729 A | 8/1987 |
| JP | 7-5376 U | 1/1995 |
| JP | 2006-101719 A | 4/2006 |

OTHER PUBLICATIONS

International Serch Report for PCT/JP2019/033380 dated Nov. 12, 2019.
Written Opinion of the International Searching Authority for PCT/JP2019/033380 (PCT/ISA/237) dated Nov. 12, 2019.
International Preliminary Report on Patentability and English translation of the Written Opinion of the International Searching Authority, dated Mar. 11, 2021, for International Application No. PCT/JP2019/033381.
International Search Report for International Application No. PCT/JP2019/033381, dated Nov. 12, 2019.

* cited by examiner

BENDING MECHANISM, BENDING METHOD, AND FOOD MANUFACTURING METHOD

TECHNICAL FIELD

The present invention relates to a bending mechanism and a bending method which bend a sheet-shaped flexible food material, and to a food manufacturing method using a bent sheet-shaped flexible food material.

BACKGROUND ART

Various processed foods are widely provided not only to general consumers but also to stores. Processed foods can be provided in various forms, such as room temperature foods, refrigerated foods, chilled foods and frozen foods, by the development of food processing technology (in particular, the development of refrigeration technology and freezing technology). Demands for such processed foods are expected to increase further in the future as consumers' tastes diversify, needs for convenience increase, and awareness of food safety increases. In particular, it is desired to provide not only processed foods that are easy to process but also processed foods that are complicated and difficult to process.

Examples of such processed foods include rolled foods such as a spring roll and an egg roll. In order to make a rolled food, it is necessary to wrap an ingredient with a skin made of wheat flour or the like. Proper skill and experience are necessary for neatly and appropriately wrapping an ingredient with a skin, and such work is very difficult for those who are not accustomed to cooking and is often avoided. In addition, it is difficult even for a person who is accustomed to cooking to make a large amount of rolled foods with uniform quality, and it is a burdensome work that requires time and labor. Therefore, processors make large quantities of rolled foods using a food manufacturing apparatus that is able to automatically manufacture such rolled foods.

For example, Patent Literature 1 discloses a method and an apparatus for automatically entraining an ingredient in a skin material. In the apparatus disclosed in Patent Literature 1, the skin material is lifted and bent by rocking of a swinging pestle and is put on an ingredient. When an ingredient is wrapped with a skin by the apparatus in this way, the skin which is positively bent by a member is placed on the ingredient. This process of covering an ingredient with a skin is performed in a similar manner also when the ingredient is further covered with a portion of the skin located on a side of the ingredient in a state where the ingredient is wrapped in the skin.

Further, Patent Literature 2 discloses an apparatus which folds a pastry dough a plurality of times in such a manner that a food (a spring roll, tacos, etc.) in which an ingredient is wrapped by a pastry dough is manufactured.

Further, Patent Literature 3 discloses a manufacturing apparatus for a rolled food which uses a plurality of rollers to wrap an ingredient with an outer skin.

CITATION LIST

Patent Literature

Patent Literature 1: Japanese patent application publication No. 50-157578
Patent Literature 2: U.S. Pat. No. 8,505,445
Patent Literature 3: Japanese patent application publication No. 2006-101719

SUMMARY OF INVENTION

Technical Problem

While food manufacturing apparatuses which are capable of automatically wrapping an ingredient with a skin, such as the apparatus in Patent Literature 1 described above, are already known, it is desired to further improve such apparatuses and methods.

Specifically, an apparatus and a method which are capable of manufacturing a large amount of rolled foods with more uniform and higher quality are desired. For example, if folded parts of skins vary between the skins when ingredients are wrapped with the skins, not only the aesthetic appearance of the rolled foods is spoiled, but also the deliciousness such as texture is adversely affected, and therefore, there is also a concern that predetermined standards are not met and thus the value as a product is completely impaired.

In addition, processing speed is also important in order to manufacture as many rolled foods as possible during a limited time. In particular, while delicate handling is required when an ingredient is wrapped with a flexible and breakable skin, it is not easy to perform such delicate handling at high speed and reliably. Further, in a production system where other works are continuously performed before and after the work of wrapping an ingredient with a skin, such as a production system for spring rolls, there is also a concern that the work of wrapping an ingredient with a skin becomes a bottleneck, so that the improvement of the productivity of the entire system is hindered.

When a skin is positively bent by a member of an apparatus (for example, the folding plate of Patent Literature 2) as in the conventional apparatuses described above, it is required to provide a dedicated member for bending a skin independently from a member for conveying a skin, and the like. Further, in a case where a dedicated member for bending a skin is provided, it is necessary to provide a mechanism and a power source for driving the dedicated member. In addition, it is necessary to control the movement of a dedicated member to sufficiently reduce damage which can be given to a skin because the damage of the skin, or the like, may be caused when the skin is swiftly bent with the dedicated member.

Further, according to the manufacturing apparatus disclosed in Patent Literature 3, the left and right end portions of an outer skin are raised and are folded inward by left and right annular belts respectively, but it is difficult for this manufacturing apparatus to accurately and stably fold the left and right end portions of an outer skin. It is very important to fold outer skins at a predetermined position with high accuracy in order to stably manufacture a large amount of final products (foods) which have a desired texture and a desired taste and also have an excellent aesthetic appearance. However, in the apparatus in Patent Literature 3, there are concerns that the folding positions of the left and right end portions of outer skins are not stable, so that the folding positions vary among a plurality of outer skins which are continuously processed in the apparatus and the left and right end portions of each outer skin are not folded in a symmetric fashion.

The present invention has been contrived in view of the above circumstances, and an object of the present invention is to provide a bending mechanism, a bending method, and a food manufacturing method which are capable of bending a sheet-shaped flexible food material, such as a skin, with high accuracy and high speed. Further, another object of the present invention is to provide a bending mechanism, a bending method and a food manufacturing method which are capable of improving food productivity.

Solution to Problem

One aspect of the present invention is directed to a bending mechanism which bends a sheet-shaped flexible food material, the bending mechanism comprising: a conveyance unit which conveys the flexible food material in such a manner that the flexible food material passes through a second conveyance area after passing through a first conveyance area; and a support unit which supports a bending reference portion being a part of the flexible food material, in at least a part of a section while the flexible food material is conveyed from the first conveyance area to the second conveyance area, wherein the conveyance unit includes: a first component part which supports a base portion of the flexible food material positioned on one side with reference to the bending reference portion; and a second component part which supports a bending portion of the flexible food material positioned on another side with reference to the bending reference portion, and wherein an angle formed by a support portion of the second component part which makes contact with the bending portion with respect to a support portion of the first component part which makes contact with the base portion continuously changes from the first conveyance area toward the second conveyance area in such a manner that an angle of the bending portion with respect to the base portion in the second conveyance area is larger than an angle of the bending portion with respect to the base portion in the first conveyance area.

The second component part, which supports the bending portion while the flexible food material is conveyed from the first conveyance area to the second conveyance area, may include a plurality of string-shaped supports, the support portion of the second component part may be formed by portions of the plurality of string-shaped supports which make contact with the flexible food material, and arrangement of the plurality of string-shaped supports in each of the first conveyance area and the second conveyance area may be adjusted in such a manner that the angle formed by the support portion of the second component part with respect to the support portion of the first component part continuously changes from the first conveyance area toward the second conveyance area.

The plurality of string-shaped supports may be wound around and supported by a first rotation shaft and a second rotation shaft, and an alignment direction of portions of the plurality of string-shaped supports wound around and supported by the first rotation shaft may be different from an alignment direction of the plurality of string-shaped supports wound around and supported by the second rotation shaft.

The first rotation shaft may extend along a horizontal direction, and the second rotation shaft may extend in a direction which is not along a horizontal direction.

The plurality of string-shaped supports may be arranged in such a manner that a string-shaped support arranged farther in a horizontal direction from the bending reference portion in the first conveyance area is arranged at a higher position in a height direction in the second conveyance area.

The support unit may include a support moving body which travels from the first component part toward the second conveyance area while being in contact with the bending reference portion.

The support unit may further include a first support roller and a second support roller which the support moving body is wound around and supported by, and the support moving body may travel with axial rotation of each of the first support roller and the second support roller.

The first conveyance area and the second conveyance area may be separated in a horizontal direction from each other, and an angle formed by the bending portion with respect to a horizontal plane in the second conveyance area may be larger than an angle formed by the bending portion with respect to the horizontal plane in the first conveyance area.

The two second component parts may be provided in such a manner that the first component part is arranged between the two second component parts, the two support units may be provided, the two support units respectively supporting the bending reference portions existing at two locations of the flexible food material, and the flexible food material may have the two bending portions arranged in such a manner that the base portion is arranged between the two bending portions.

Another aspect of the present invention is directed to a bending method of bending a sheet-shaped flexible food material, the bending method comprising the step of causing a conveyance unit to convey the flexible food material in such a manner that the flexible food material passes through a second conveyance area after passing through a first conveyance area, wherein a bending reference portion being a part of the flexible food material is supported by a support unit, in at least a part of a section while the flexible food material is conveyed from the first conveyance area to the second conveyance area, wherein the conveyance unit includes: a support portion of a first component part which supports a base portion of the flexible food material positioned on one side with reference to the bending reference portion; and a support portion of a second component part which supports a bending portion of the flexible food material positioned on another side with reference to the bending reference portion, and wherein an angle formed by the support portion of the second component part respect to the support portion of the first component part continuously changes from the first conveyance area toward the second conveyance in such a manner that an angle of the bending portion with respect to the base portion in the second conveyance area is larger than an angle of the bending portion with respect to the base portion in the first conveyance area.

Another aspect of the present invention is directed to a food manufacturing method using a sheet-shaped flexible food material bent by the bending method described above.

Advantageous Effects of Invention

According to the present invention, a sheet-shaped flexible food material can be bent with high accuracy and high speed. Further, food productivity can be improved.

DESCRIPTION OF EMBODIMENTS

Hereinafter, typical embodiments of the present invention will be described as examples with reference to the drawings. For convenience of illustration and understanding, the size and the scale of the elements shown in each drawing do not necessarily correspond to a real thing and do not necessarily correspond to each other between the drawings. However, those skilled in the art could clearly understand the configurations, the actions and the effects of the elements shown in each of the drawings, in light of the descriptions of the present specification and the claims.

In the following embodiments, a system which manufactures spring rolls is described as an example, and a skin for a spring roll is used as a "sheet-shaped flexible food material". The present invention is not limited to the following embodiments, and the present invention may be applied to foods other than spring rolls. Typically, the present invention can be suitably applied to rolled foods in which an ingredient is wrapped with a skin. However, the present invention can also be applied to apparatuses and methods which manufacture other foods, and for example, it is also possible to apply the present invention to an apparatus which manufactures a food (such as an egg roll) which is constituted by a skin only without arranging an ingredient inside of the food.

[One Example of a Method of Manufacturing a Spring Roll]

FIGS. 1A to 1F are diagrams for explaining an example of a method of manufacturing a spring roll (in particular, a technique for folding a skin). FIG. 2 is a flowchart of the method of manufacturing a spring roll illustrated in FIGS. 1A to 1F.

Figure 1A:
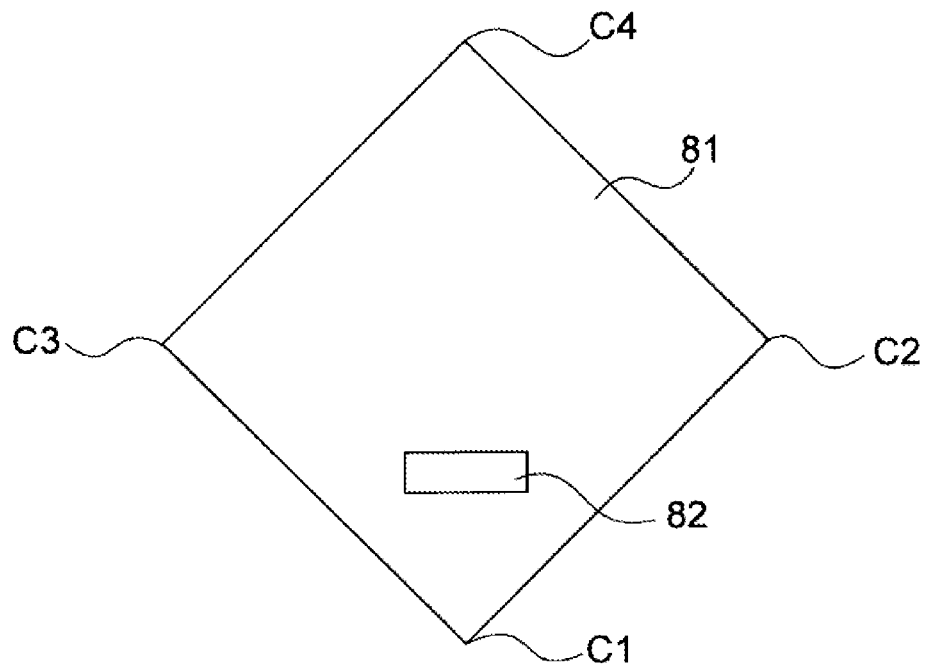
FIG. 1A is a diagram for explaining an example of a method of manufacturing a spring roll (in particular, a technique for folding a skin).
Figure 2:
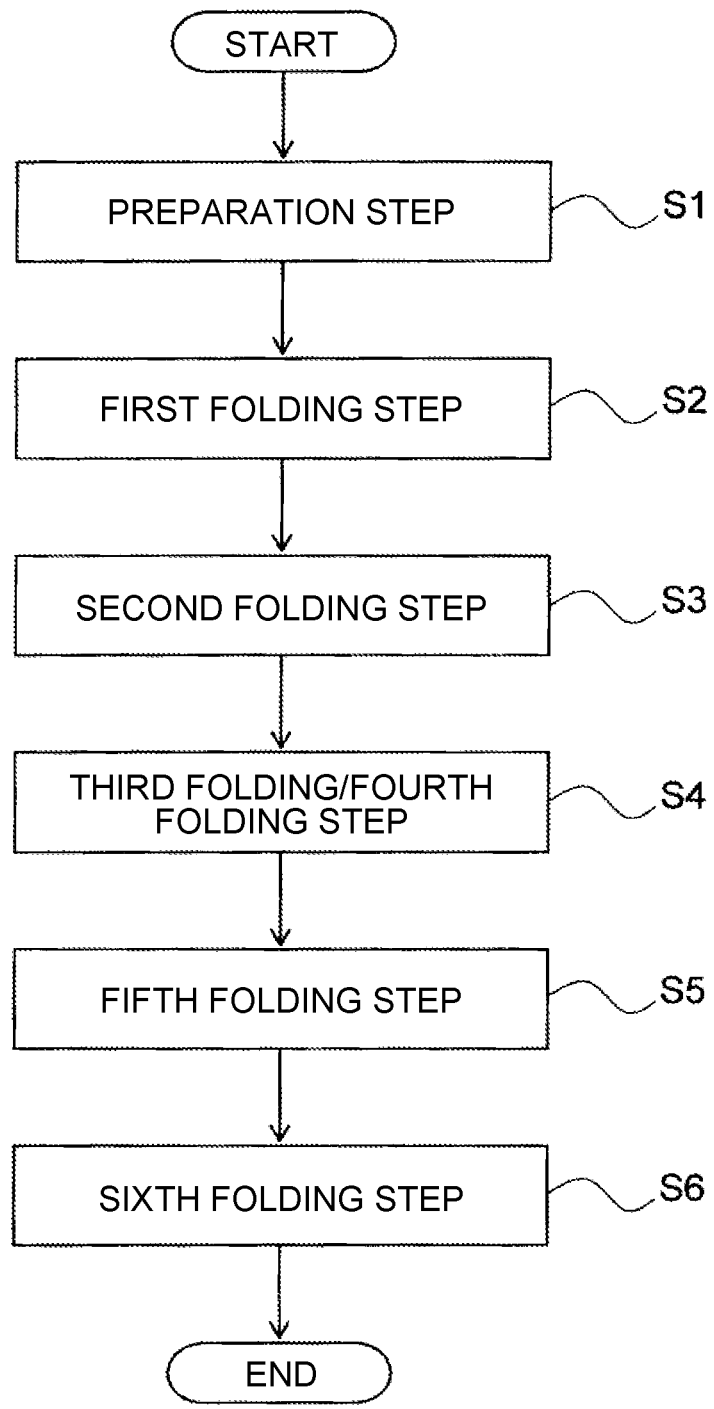
FIG. 2 is a flowchart of the method of manufacturing a spring roll illustrated in FIGS. 1A to 1F.

First, an ingredient 82 is placed on a skin 81 which has been spread as indicated in FIG. 1A (a preparation step S1). In the present example, the ingredient 82 is placed on one of the two isosceles triangles (i.e., the lower triangle in FIG. 1A) included in the quadrangular (in particular, square) skin 81.

Figure 1B:
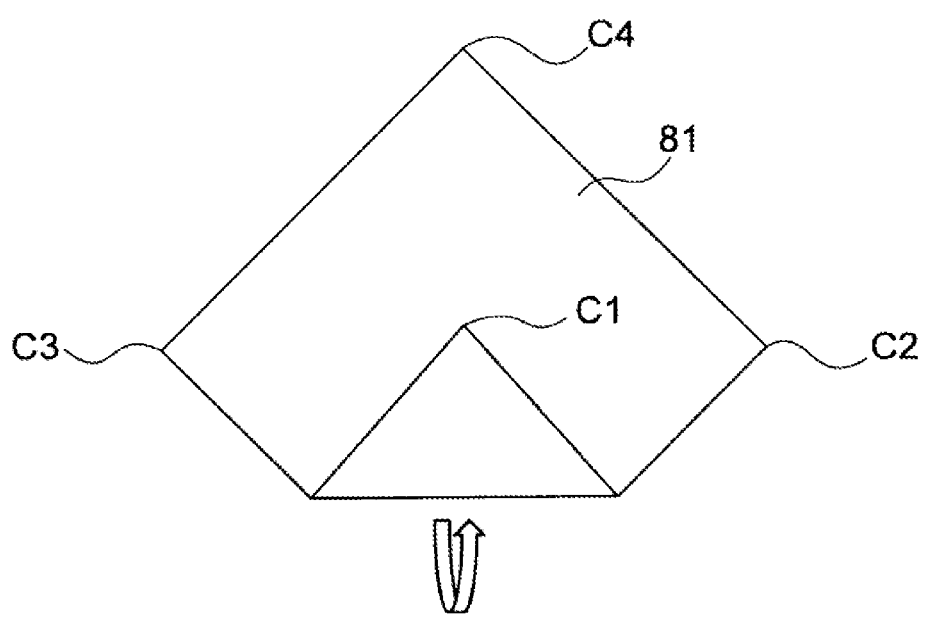
FIG. 1B is a diagram for explaining an example of a method of manufacturing a spring roll (in particular, a technique for folding a skin).

Then, as illustrated in FIG. 1B, a part of the skin 81 is folded back, so that the ingredient 82 is covered and wrapped with the skin 81 (a first folding step S2). In the present example, one of the four vertices of the skin 81 (i.e., the lower vertex in FIG. 1B; hereinafter also referred to as a "first vertex C1") is folded back toward the opposite vertex.

Figure 1C:
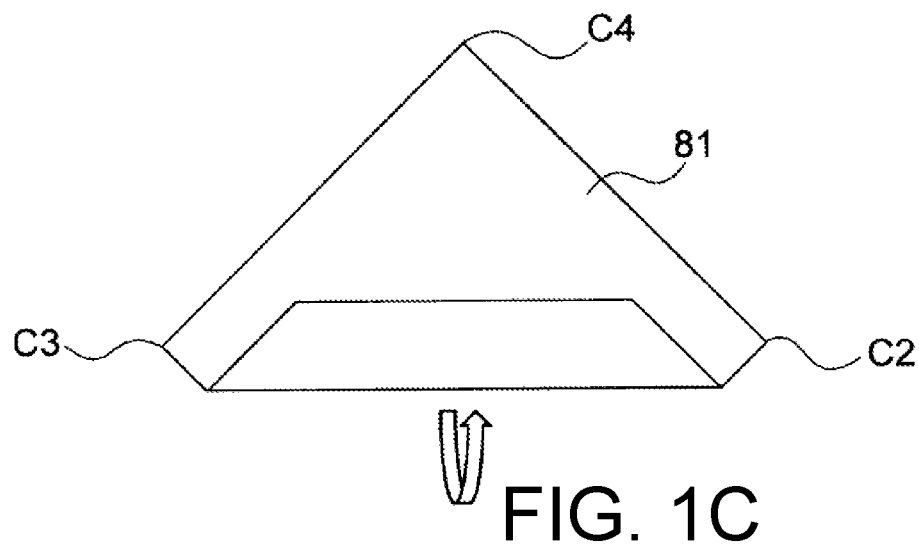
FIG. 1C is a diagram for explaining an example of a method of manufacturing a spring roll (in particular, a technique for folding a skin).

Then, the skin 81 is further folded back as illustrated in FIG. 1C, so that the ingredient 82 is wrapped by the skin 81 (a second folding step S3). In the present example, the skin 81 is folded back in such a manner that all or part of the portion of the skin 81 positioned above the ingredient 82 immediately after the first folding step S2 is arranged below the ingredient 82.

Figure 1D:
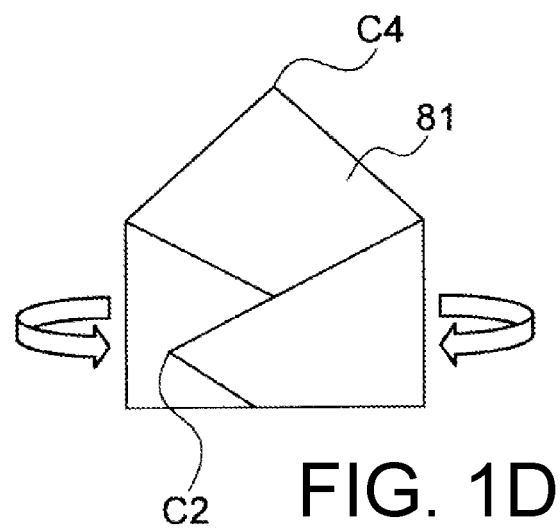
FIG. 1D is a diagram for explaining an example of a method of manufacturing a spring roll (in particular, a technique for folding a skin).

Then, the left and right portions of the skin 81 are folded back as illustrated in FIG. 1D, so that the ingredient 82 is covered also by these left and right portions of the skin 81 (a third folding/fourth folding step (a skin bending step) S4). In the present example, two vertices (i.e., the left and right vertices in FIG. 1D; hereinafter, also referred to as a "second vertex C2" and a "third vertex C3") arranged adjacent to the first vertex C1, included in the folded portion in the first folding step S2 and the second folding step S3, are moved in such a manner that the skin 81 is folded in the directions perpendicular to the bending direction of the skin 81 in the first folding step S2 and the second folding step S3.

Figure 1E:
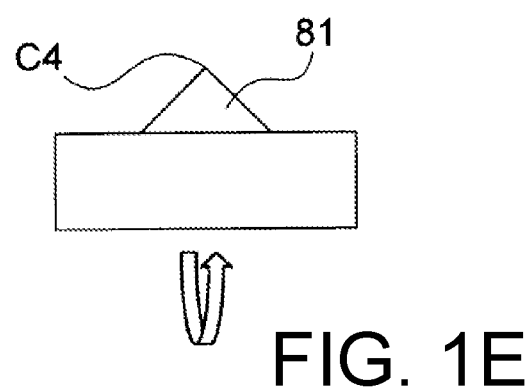
FIG. 1E is a diagram for explaining an example of a method of manufacturing a spring roll (in particular, a technique for folding a skin).

Then, the ingredient 82 is further rolled toward the remaining vertex (i.e., the upper vertex in FIG. 1D: hereinafter also referred to as a "fourth vertex C4") along with the portion of the skin 81 covering the ingredient 82 as illustrated in FIG. 1E, so that the ingredient 82 is further wrapped with the skin 81 (a fifth folding step S5). In this situation, a portion of the skin 81 including the fourth vertex C4 is located outside the ingredient 82.

Figure 1F:
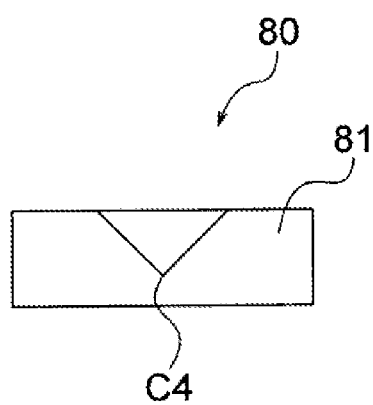
FIG. 1F is a diagram for explaining an example of a method of manufacturing a spring roll (in particular, a technique for folding a skin).

Then, the portion of the skin 81 including the fourth vertex C4 is folded back so as to cover the ingredient 82 as illustrated in FIG. 1F (a sixth folding step S6). In this situation, the portion of the skin 81 including the fourth vertex C4 may be attached to the portion of the skin 81 which has already covered the ingredient 82. For attaching portions of the skin 81 to each other, a liquid which contains a binder component, such as wheat flour, or a liquid (water or the like) which does not contain such a binder component may be used as glue.

By carrying out the series of the above-mentioned steps (i.e., the preparation step S1 to the sixth folding step S6), a spring roll 80 having a rectangular planar shape can be produced (see FIG. 1F). As described above, in order to produce a spring roll 80, a skin 81 is bent in each step (in particular, the first folding step S2 to the sixth folding step S6). In order to finally obtain a spring roll 80 which has an excellent aesthetic appearance, it is important to properly fold a skin 81 in each step. In particular, in the third folding/fourth folding step S4, it is difficult to fold a skin 81 with high quality and uniformly because the skin 81 is folded in directions different from the rolling direction of an ingredient 82 (that is, the vertical direction in FIGS. 1A to 1F) in a state where a plurality of layers of the skin 81 are stacked.

Figure 3:
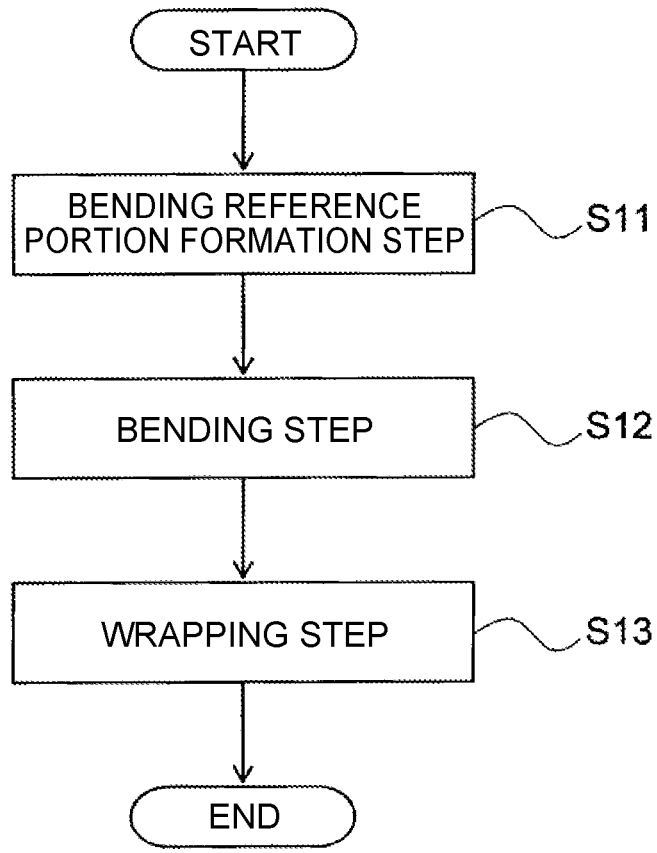
FIG. 3 is a flowchart showing an example of a step for third folding and fourth folding.
Figure 4:
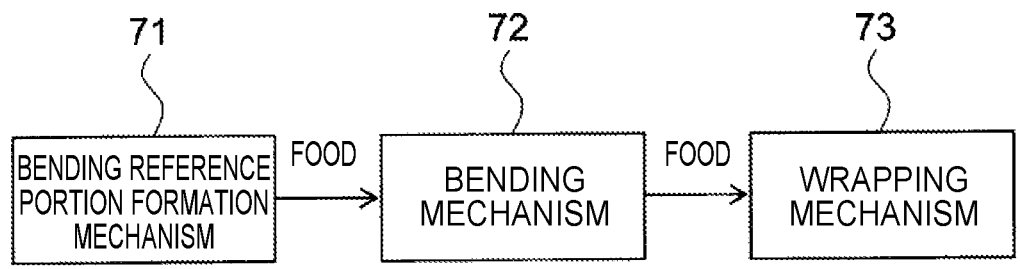
FIG. 4 is a block diagram of mechanisms which carry out the third folding/fourth folding step illustrated in FIG. 3.

Therefore, the third folding/fourth folding step S4 in the present embodiment is carried out as illustrated in FIGS. 3 and 4.

FIG. 3 is a flowchart showing an example of the third folding/fourth folding step S4. FIG. 4 is a block diagram of mechanisms which carry out the third folding/fourth folding step S4 illustrated in FIG. 3.

The third folding/fourth folding step S4 of the present embodiment includes a bending reference portion formation step S11, a bending step S12 and a wrapping step S13.

In the bending reference portion formation step S11, reference portions for the folding performed in the third folding/fourth folding step S4 (hereinafter, also referred to as "bending reference portions") are formed in a skin 81 by a bending reference portion formation mechanism 71. As long as the "bending reference portions" are, in a broad sense, conceptually reference portions for folding of a skin 81, creases or marks, or the like, are not necessarily provided to the bending reference portions. However, from the viewpoint of facilitating the folding of a skin 81, it is preferable to give creases or marks, or the like, to the bending reference portions. The specific aspect of the bending reference portions is not limited in particular, and typically, the bending reference portions can be formed by creases (see reference numeral "85" in FIG. 5). The method of forming creases configuring the bending reference portions is not limited in particular. For example, a crease may be given by actually folding a skin 81 once, or a crease may be given by locally sandwiching a portion corresponding to a bending reference portion of a skin 81 to applying pressure thereto. Further, a crease configuring a bending reference portion may be formed by slitting a skin 81. The formation of such a bending reference portion may be performed in a state where an ingredient 82 is placed on a skin 81 or may be performed in a state where an ingredient 82 is not placed on a skin 81.

In the bending step S12, a skin 81 is bent, with reference to the bending reference portions, by a bending mechanism 72. Then, in the wrapping step S13, raised portions of a skin 81 are placed on an ingredient 82 by a wrapping mechanism 73. The bending mechanism 72 and the wrapping mechanism 73 may be configured by a common mechanism or may be configured by different mechanisms from each other.

As described above, the bending mechanism 72 of the present embodiment carries out the bending step S12 of the third folding/fourth folding step S4. Below, a specific configuration example of the bending mechanism 72 will be described. In the present embodiment, an apparatus (including a mechanism) and a method according to the present invention are applied to the third folding/fourth folding step S4, but an apparatus (including a mechanism) and a method according to the present invention may be applied to another step involving bending of a skin 81 (for example, the first folding step S2, the second folding step S3, the fifth folding step S5, and the sixth folding step S6).

[Bending Mechanism]

Figure 5:
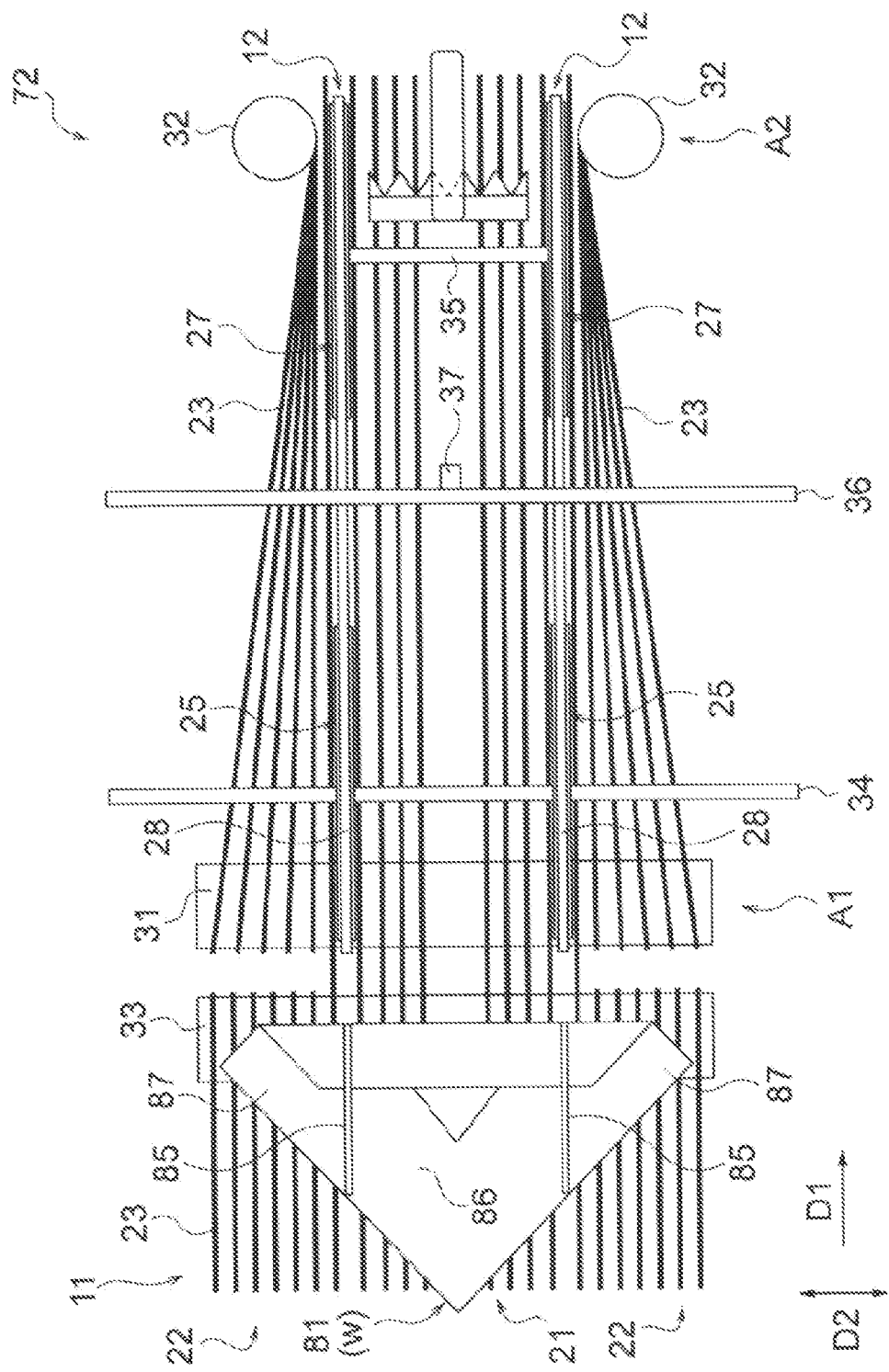
FIG. 5 is a plan view of a bending mechanism.
Figure 6:
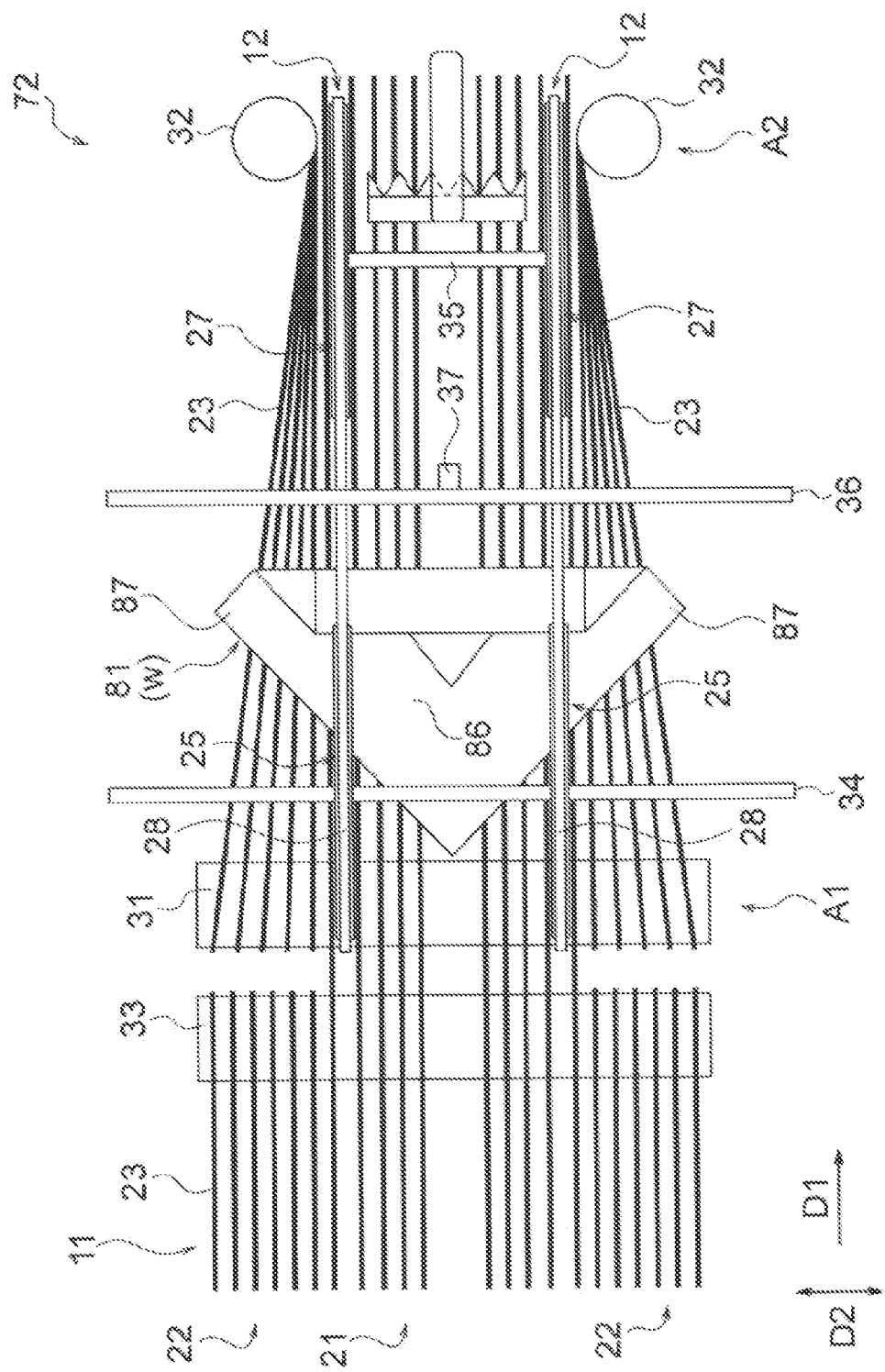
FIG. 6 is a plan view of a bending mechanism.
Figure 7:
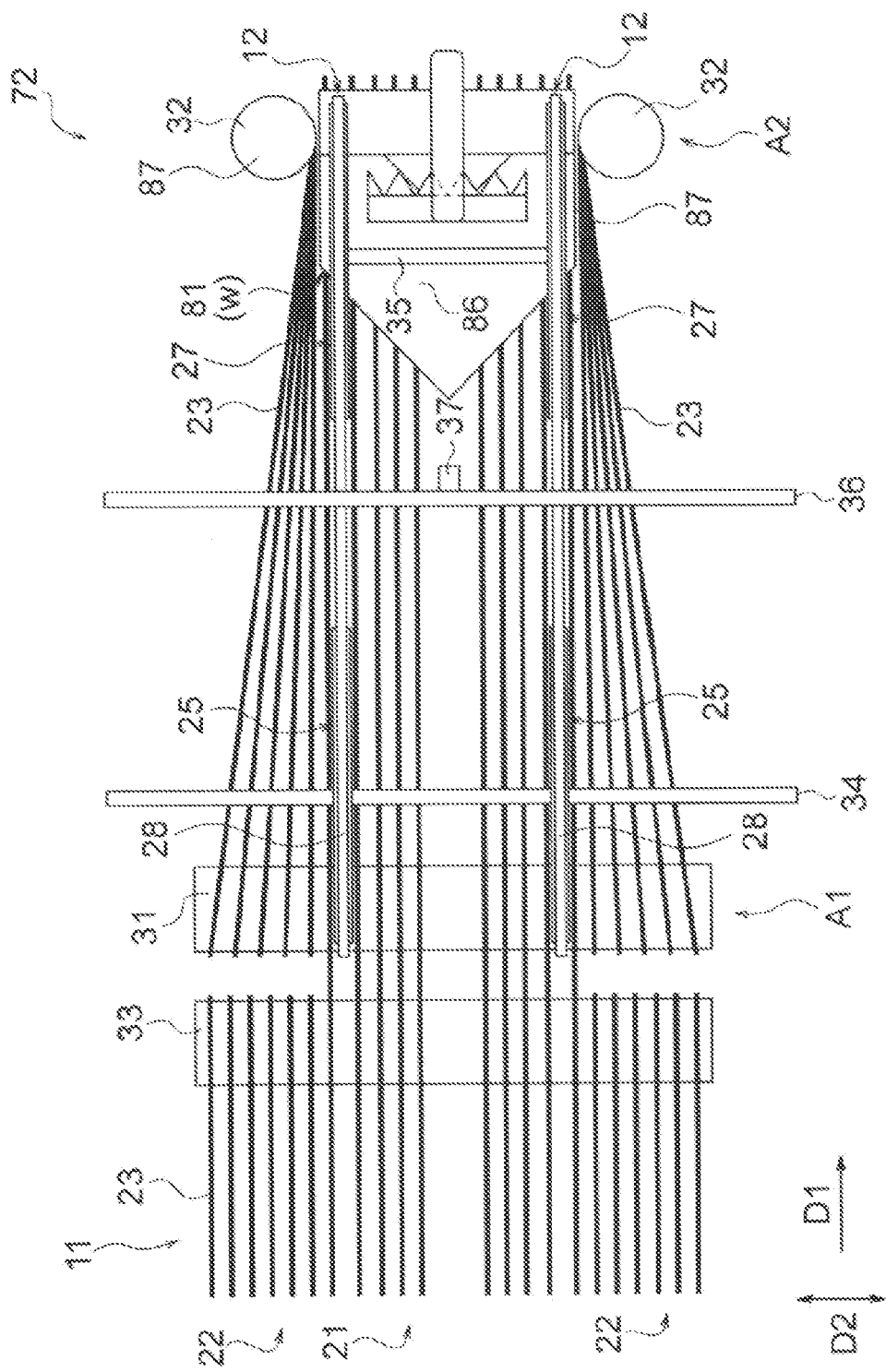
FIG. 7 is a plan view of a bending mechanism.

FIGS. 5 to 7 are plan views of the bending mechanism 72. FIGS. 8 to 13 are side views of the bending mechanism 72. For ease of understanding, the illustration of some of the elements constituting the bending mechanism 72 is omitted in each of FIGS. 5 to 13. For example, in FIGS. 5 to 7, the illustration of a relay guide unit 26 and a moving body guide 39 is omitted. Further, in FIGS. 8 to 13, the illustration of a third support shaft 36 is omitted. Further, although the state of a skin 81 illustrated in FIGS. 5 to 13 does not necessarily exactly correspond to the state of a skin 81 illustrated in FIGS. 1C and 1D described above, FIGS. 5 to 13 are drawings corresponding to the third folding/fourth folding step S4 (see FIG. 2).

The bending mechanism 72 of the present embodiment is a mechanism which bends a skin 81 for a spring roll, and comprises a conveyance unit 11 and support units 12. In order to fold a skin 81 neatly as illustrated in FIG. 1D, both end portions of the skin 81 are raised by the bending mechanism 72, and after that, the skin 81 is folded by the wrapping mechanism 73 in such a manner that both end portions of the skin 81 are placed over an ingredient 82.

An object conveyed by the conveyance unit 11 is also referred to as a work W. In the present embodiment, an ingredient 82 is already placed on a skin 81 conveyed by the conveyance unit 11 (see FIGS. 1A to 1C) and the conveyance unit 11 conveys, in the conveyance direction D1, a skin 81 on which an ingredient 82 has been placed. Therefore, a skin 81 and an ingredient 82 conveyed by the conveyance unit 11 are also collectively referred to as a work W. The conveyance unit 11 may convey a skin 81 only, and in such a case, a work W is constituted by a skin 81 only.

The bending mechanism 72 conveys a skin 81 in the conveyance direction D1, while sandwiching the skin 81 between the conveyance unit 11 and each support unit 12, so that both end portions of the skin 81 are raised with high accuracy as the displacement (in particular, the displacement in a width direction D2 perpendicular to the conveyance direction D1) of the skin 81 placed on the conveyance unit 11 is prevented. Further, both raised end portions of the skin 81 are supported by the support units 12, and thus, are not placed on the central portion (a base portion 86) of the skin 81 in a careless manner before the third folding and fourth folding are carried out.

The conveyance direction D1 and the width direction D2 are both horizontal directions perpendicular to the vertical direction, in which gravity acts, in the present embodiment, but may be directions inclined with respect to a horizontal direction and the height direction D3 along the vertical direction.

As illustrated in FIG. 5, the bending reference portions 85 formed in two parts of a skin 81 are provided at positions where the bending reference portions 85 are separated from each other in the width direction D2. While each of these bending reference portions 85 is sandwiched between the conveyance unit 11 and a support unit 12, the skin 81 is sent from the upstream side to the downstream side in a state where both end portions in the width direction D2 (that is, bending portions 87) of the skin 81 are supported by a twisted string conveyor, so that both end portions of the skin 81 are continuously and gradually raised.

A skin 81 bent into a desired shape by the bending mechanism 72 is sent to the wrapping mechanism 73 in the subsequent stage (see FIG. 4) and is neatly folded, as illustrated in FIG. 1D, by the wrapping mechanism 73.

[Skin (Sheet-Shaped Flexible Food Material)]

A skin 81 has bending reference portions 85, a base portion 86, and bending portions 87.

The bending reference portions 85 are parts of a skin 81 which form creases, and are formed in the skin 81 by the bending reference portion formation mechanism 71 (see FIG. 4) before the work W (i.e., the skin 81 and an ingredient 82) is sent to the bending mechanism 72. In the present embodiment, the bending reference portions 85 are formed at two locations in a skin 81. Each bending reference portion 85 extends along the conveyance direction D1 of a skin 81.

The base portion 86 is a part of a skin 81 located on one side with reference to the bending reference portions 85. The base portion 86 of the present embodiment is configured by a portion of a skin 81 located between the two bending reference portions 85. Specifically, the base portion 86 is formed by the central portion in the width direction D2 of a skin 81. While a skin 81 is conveyed by the conveyance unit 11, the base portion 86 keeps its state of extending in a horizontal direction and is sent from the upstream side towards the downstream side.

The bending portions 87 are parts of a skin 81 which are located on the other side with reference to the bending reference portions 85. The bending portions 87 of the present embodiment are configured by two end portions (i.e., the upper end portion and the lower end portion in FIGS. 5 to 7) of a skin 81 which are opposite to each other. Specifically, the bending portions 87 are configured by both end portions in the width direction D2 of a skin 81. As a skin 81 is conveyed from the upstream side toward the downstream side by the conveyance unit 11, each bending portion 87 is raised little by little.

[Conveyance Unit]

The conveyance unit 11 conveys a skin 81 (that is, a work W) in such a manner that the skin 81 passes through a second conveyance area A2 after passing through a first conveyance area A1.

The first conveyance area A1 and the second conveyance area A2 are separated from each other in a horizontal direction (in particular, the conveyance direction D1). The first conveyance area A1 of the present embodiment is an upstream area with reference to the upstream end portion of each support unit 12 and is an area in the vicinity of a first rotation shaft 31. The second conveyance area A2 of the present embodiment is a downstream area with reference to the downstream end portion of each support unit 12 and is an area in the vicinity of second rotation shafts 32. In the present embodiment, the range of the first conveyance area A1 in the conveyance direction D1 is defined with reference to first support rollers 25 (in particular, the central axis of the first support rollers 25), and the range of the second conveyance area A2 in the conveyance direction D1 is defined with reference to second support rollers 27 (in particular, the central axis of the second support rollers 27).

The whole of the conveyance unit 11 of the present embodiment is configured by a plurality of string-shaped supports 23. Each string-shaped support 23 extends in the conveyance direction D1.

The conveyance unit 11 includes: a first component part 21 which supports the base portion 86 of a skin 81 located on one side with respect to each bending reference portion 85; and second component parts 22 which support the bending portions 87, located on the other side, of a skin 81. In the present embodiment, two bending portions 87 of a skin 81 are arranged in such a manner that one base portion 86 is arranged between the two bending portions 87 as described above, and therefore, two second component parts 22 are provided in such a manner that one first component part 21 is arranged between the two second component parts 22.

Each of the string-shaped supports 23 forming the first component part 21 has an endless shape and extends along the conveyance direction D1. Each of the string-shaped supports 23 forming the first component part 21 is wound around and supported by a rotation shaft (not shown) arranged on the upstream side (for example, on the upstream side from a conveyance rotation shaft 33) and a third rotation shaft 48 (see FIGS. 8 to 13) arranged on the downstream side (for example, on the downstream side from a position where the distance in the height direction D3 between the first component part 21 and the second support rollers 27 is minimized (in the illustrated example, on the downstream side from a second support shaft 35)), and travels in the conveyance direction D1 in accordance with the axial rotation of at least one of these rotation shafts.

Each of the string-shaped supports 23 forming the first component part 21 is reversed at the third rotation shaft 48 arranged on the downstream side and travels toward the rotation shaft (not shown) arranged on the upstream side. Further, each of the string-shaped supports 23 forming the first component part 21 is reversed at the rotation shaft (not shown) arranged on the upstream side and travels toward the third rotation shaft 48 arranged on the downstream side.

The support portion of the first component part 21 which makes contact with the base portion 86 of a skin 81 is configured by portions of a plurality of string-shaped supports 23 traveling from the upstream side toward the downstream side which come into contact with the skin 81. The plurality of string-shaped supports 23 traveling from the upstream side toward the downstream side are supported by a moving body guide 39 from below (see FIGS. 8 to 13) so as to be able to travel in the conveyance direction D1. This prevents the position in the height direction D3 of the first component part 21 from fluctuating due to the influence of the weight of a work W (i.e., a skin 81 and an ingredient 82), and thus the support portion of the first component part 21 is kept at almost the same height direction position over the range from the first conveyance area A1 to the second conveyance area A2.

The first component part 21 is not limited to the plurality of string-shaped supports 23 illustrated in drawings and may adopt an arbitrary structure capable of appropriately conveying the base portion 86 of a skin 81 from the upstream side to the downstream side.

The illustrated second component parts 22 include: a plurality of string-shaped supports 23 arranged on the upstream side from the first conveyance area A1 (that is, on the upstream side from the first rotation shaft 31); and a plurality of string-shaped supports 23 arranged over the range from the first conveyance area A1 to the second conveyance area A2.

The conveyance rotation shaft 33 is provided on the upstream side from the first conveyance area A1. The conveyance rotation shaft 33 extends in the width direction D2. The first rotation shaft 31 extends parallel to the conveyance rotation shaft 33 at a position away from the conveyance rotation shaft 33 in the conveyance direction D1. The plurality of string-shaped supports 23 forming the second component parts 22 on the upstream side from the first conveyance area A1 have an endless shape, are wound around and supported by the conveyance rotation shaft 33 and a rotation shaft (not shown) provided on the upstream side from the conveyance rotation shaft 33, and travel along the conveyance direction D1 according to the axial rotation of at least one of these rotation shafts.

On the other hand, the plurality of string-shaped supports 23 forming the second component parts 22 which support the bending portions 87 while a skin 81 is conveyed from the first conveyance area A1 to the second conveyance area A2 have an endless shape and are wound around and supported by the first rotation shaft 31 and the second rotation shafts 32.

The first rotation shaft 31 extends along a horizontal direction. Specifically, the first rotation shaft 31 is arranged in the vicinity of the upstream end portion of each support unit 12 and extends in the width direction D2. With respect to the conveyance direction D1, the central axis (that is, the rotation axis) of the first rotation shaft 31 may be arranged on the upstream side or on the downstream side from the central axes of the first support rollers 25, or may be arranged at the position which is the same as the central axes of the first support rollers 25. The second rotation shafts 32 extend in a direction which is not along a horizontal direction. Specifically, the second rotation shafts 32 are arranged in the vicinity of the downstream end portions of the respective support units 12 and extend along the height direction D3. With respect to the conveyance direction D1, the central axes of the second rotation shafts 32 (that is, the rotation axes) may be arranged on the upstream side or on the downstream side from the central axes of the second support rollers 27, or may be arranged at the position which is the same as the central axes of the second support rollers 27. In the present embodiment, two second rotation shafts 32 are provided. These second rotation shafts 32 are arranged in such a manner that the first component part 21 is arranged between the two second rotation shafts 32 in the width direction D2.

As described above, the extension direction of the first rotation shaft 31 and the extension direction of each of the second rotation shafts 32 are different from each other; therefore, of the plurality of string-shaped supports 23 forming the second component parts 22, the alignment direction of the parts which are wound around and supported by the first rotation shaft 31 is different from the alignment direction of the parts which are wound around and supported by the second rotation shafts 32. Specifically, of the plurality of string-shaped supports 23 forming the second component parts 22, the alignment direction of the parts wound around and supported by the first rotation shaft 31 is a horizontal direction (in particular, the width direction D2), and the alignment direction of the parts wound around and supported by the second rotation shafts 32 is the height direction D3.

The traveling direction of each of the string-shaped supports 23 forming the second component parts 22 is reversed at the rotation shafts which each string-shaped support 23 is wound around and supported by. For example, the plurality of string-shaped supports 23 forming the second component parts 22 arranged on the upstream side from the first conveyance area A1 travel from the rotation shaft arranged on the upstream from the conveyance rotation shaft 33 towards the conveyance rotation shaft 33, are reversed at the conveyance rotation shaft 33, travel from the conveyance rotation shaft 33 toward the rotation shaft arranged on the upstream, are reversed at the rotation shaft arranged on the upstream, and travel from the upstream side toward the downstream side again. Similarly, the string-shaped supports 23 of the second rotation shafts 32 which are wound around and supported by the first rotation shaft 31 and each of the second rotation shafts 32 travel from the first rotation shaft 31 toward the corresponding second rotation shaft 32, are reversed at the corresponding second rotation shaft 32, travels from the corresponding second rotation shaft 32 toward the first rotation shaft 31, and are reversed at the first rotation shaft 31 and travel from the upstream side to the downstream side again.

Therefore, the support portions of the second component parts 22 which make contact with the bending portions 87 of a skin 81 are formed by portions of a plurality of string-shaped supports 23 traveling from the upstream side toward the downstream side which make contact with the skin 81.

In this way, the arrangement of the plurality of string-shaped supports 23 in each of the first conveyance area A1 and the second conveyance area A2 is adjusted in such a manner that the angle formed by the support portion of a second component part 22 with respect to the support portion of the first component part 21 continuously changes from the first conveyance area A1 toward the second conveyance area A2.

Here, the "angle formed by the support portion of a second component part 22 with respect to the support portion of the first component part 21" is, for example, the angle formed by the entire of the portions of the plurality of string-shaped supports 23 forming a second component part 22 which make contact with a skin 81 (in particular, the portions aligned in the width direction D2) with respect to the entire of the portions of the plurality of string-shaped supports 23 forming the first component part 21 which make contact with the skin 81 (in particular, the portions aligned in the width direction D2). The cases where the angle changes continuously are cases where the angle changes smoothly and excludes cases where the angle changes suddenly. The cases where the angle changes continuously may include not only cases where the angle changes successively but also cases where there is a partial section where the angle does not change. Therefore, the section between the first conveyance area A1 and the second conveyance area A2 is configured by only a section in which the "angle formed by the support portion of a second component part 22 with respect to the support portion of the first component part 21" changes or may be configured by both a section in which the angle changes and a section in which the angle does not change.

Specifically, of the plurality of string-shaped supports 23 forming the second component parts 22, a string-shaped support 23 arranged farther in the horizontal direction (in particular, in the width direction D2) from the bending reference portions 85 at the first conveyance area A1 (specifically, a string-shaped support 23 arranged farther from the corresponding support unit 12) is arranged at a higher position in the height direction D3 at the second conveyance area A2 (specifically, at the corresponding second rotation shaft 32).

In this way, the plurality of string-shaped supports 23 of the second component parts 22, which are the means for raising the respective bending portions 87 of a skin 81, are arranged so as to spread in a horizontal direction (in particular, the width direction D2) on the first rotation shaft 31 and are arranged so as to spread in the height direction D3 on the second rotation shafts 32. Therefore, the plurality of string-shaped supports 23 forming the second component parts 22 are in a twisted state between the first conveyance area A1 and the second conveyance area A2.

According to the conveyance unit 11 having the above-described configuration, the angle formed by the support portion of a second component part 22, which makes contact with a bending portion 87, with respect to the support portion of the first component part 21, which makes contact with the base portion 86, continuously changes little by little from the first conveyance area A1 toward the second conveyance area A2, and thus the angle of a bending portion 87 with respect to the base portion 86 in the second conveyance area A2 becomes larger than the angle of the bending portion 87 with respect to the base portion 86 in the first conveyance area A1. Specifically, the angle formed by a bending portion 87 in the second conveyance area A2 with respect to the horizontal plane is larger than the angle formed by the bending portion 87 in the first conveyance area A1 with respect to the horizontal plane.

Thus, as a work W (i.e., a skin 81 and an ingredient 82) advances from the first rotation shaft 31 toward the second rotation shafts 32, both end portions (that is, the bending portions 87) of the skin 81 are supported and are gradually raised to higher positions by the second component parts 22. Then, both end portions of the skin 81 reach the highest positions when the work W reaches the second conveyance area A2, which is a position corresponding to the second rotation shafts 32. In this way, both end portions of the skin 81 are raised by the raising means, so that the skin 81 can be neatly folded by the wrapping mechanism 73 provided in the subsequent stage (see FIG. 1D).

[Support Unit]

The support units 12 support the bending reference portions 85, which are parts of a skin 81, in at least a part of the section while the skin 81 is conveyed from the first conveyance area A1 to the second conveyance area A2. The support units 12 of the present embodiment are brought into contact with the bending reference portions 85, which are parts of a skin 81, while at least the skin 81 is conveyed from the first conveyance area A1 to the second conveyance area A2. In this situation, the bending reference portions 85 are arranged between the conveyance unit 11 and the support units 12, but the bending reference portions 85 may not or may substantially receive a force in the height direction D3 from the support units 12. In a case where the bending reference portions 85 receive a force from the support units 12 in the height direction D3, the bending reference portions 85 are sandwiched between the conveyance unit 11 and the support units 12 to effectively prevent the bending reference portions 85 from being displaced in the horizontal direction. Two support units 12 in the present embodiment are provided. The two support units 12 slightly press the respective bending reference portions 85 existing at two positions of a skin 81, against the conveyance unit 11.

Each support unit 12 has a first support roller 25, a relay guide unit 26, a second support roller 27, and a support moving body 28.

The first support roller 25 forms the upstream end portion of a support unit 12, the second support roller 27 forms the downstream end portion of a support unit 12, and the relay guide unit 26 is provided between the first support roller 25 and the second support roller 27. The support moving body 28 has an endless shape and is wound around and supported by the first support roller 25, the relay guide unit 26 and the second support roller 27, and travels in accordance with the axial rotation of each of the first support roller 25 and the second support roller 27.

A common first support shaft 34 extending in the width direction D2 is fixed to the two first support rollers 25 provided at positions where the two first support rollers 25 are separated from each other in the width direction D2. The first support shaft 34 is arranged on the central axis of each of the first support rollers 25. Further, a common second support shaft 35 extending in the width direction D2 is fixed to the two second support rollers 27 provided at positions where the two second support rollers 27 are separated from each other in the width direction D2. The second support shaft 35 is arranged on the central axis of each of the second support rollers 27. The two first support rollers 25 jointly rotate, together with the first support shaft 34, around the central axis. Further, the two second support rollers 27 jointly rotate, together with the second support shaft 35, around the central axis.

In each support unit 12, by causing at least one of the first support roller 25 and the second support roller 27 to perform the axial rotation, the support moving body 28 travels along the outer circumferences of the first support roller 25, the relay guide unit 26 and the second support roller 27. In particular, at least one of the first support roller 25 and the second support roller 27 is driven in such a manner that the part of the support moving body 28 facing the conveyance unit 11 (that is, the part located below the first support roller 25, the relay guide unit 26 and the second support roller 27) travels from the upstream side toward the downstream side (specifically, from the first support roller 25 toward the second support roller 27).

In this way, each support unit 12 has a string-shaped support moving body 28 which travels from the first conveyance area A1 toward the second conveyance area A2 while being in contact with the corresponding bending reference portion 85.

As described above, a pair of support units 12 comprising four front right, front left, back right and back left rollers (that is, the two first support rollers 25 and the two second support rollers 27) is provided above the conveyance means (i.e., the conveyance unit 11) which conveys a work W (i.e., a skin 81 and an ingredient 82). Further, a raising means (that is, the second component parts 22) for raising end portions (that is, the bending portions 87) of a skin 81 of a work W is provided outside each support unit 12 in the width direction D2.

The bending mechanism 72 further includes other necessary equipment.

For example, a trigger sensor 37 capable of detecting the passage of a skin 81 at an arbitrary position on the conveyance path of a skin 81 (a work W) may be provided. FIGS. 5 to 13 illustrate a trigger sensor 37 provided between the first conveyance area A1 and the second conveyance area A2 as an example. Above the conveyance unit 11 (in particular, the string-shaped supports 23), this trigger sensor 37 is attached to a third support shaft 36 extending in the width direction D2. This trigger sensor 37 is capable of detecting the passage of a skin 81 at a position directly below (that is, an intermediate position between the first conveyance area A1 and the second conveyance area A2). The trigger sensor 37 may be installed at another position to detect the passage of a skin 81 at another position on the conveyance path. The trigger sensor 37 can be configured by an arbitrary device such as a photo sensor and transmits the detection results to a control unit 40 (see FIG. 14).

Figure 14:
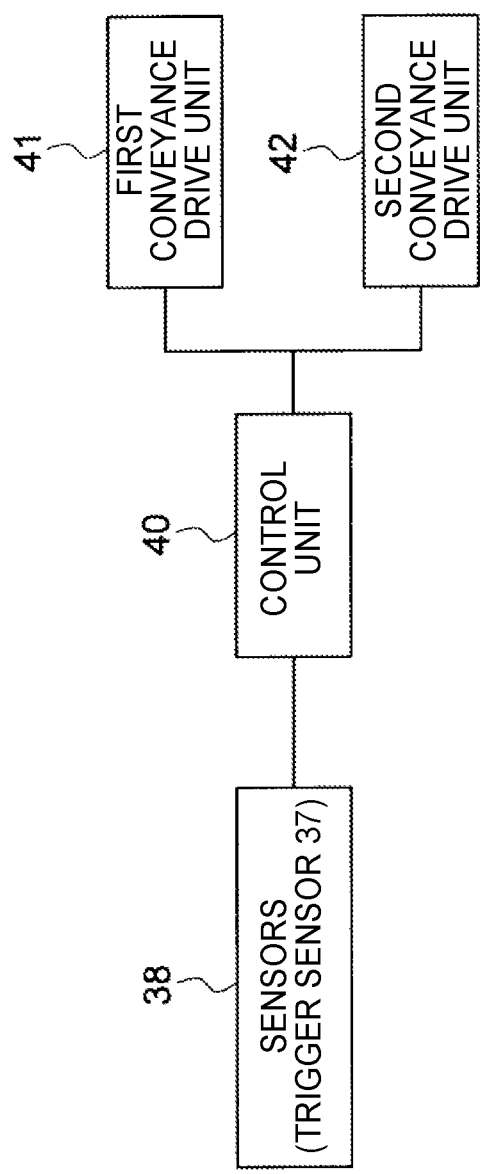
FIG. 14 is a block diagram showing an example of a functional configuration of a control unit.

FIG. 14 is a block diagram showing an example of the functional configuration of the control unit 40. Sensors 38 (for example, a trigger sensor 37), a first conveyance drive unit 41 and a second conveyance drive unit 42 are connected to the control unit 40 illustrated in FIG. 14. The control unit 40 may be connected to devices which are not illustrated in FIG. 14.

The first conveyance drive unit 41 drives the first component part 21 under the control of the control unit 40. The second conveyance drive unit 42 drives the second component parts 22 under the control of the control unit 40. In the illustrated bending mechanism 72, at least one of the rotation shafts (not shown) which the plurality of string-shaped supports 23 forming the first component part 21 are wound around and supported by is rotated by the first conveyance drive unit 41. Further, at least one of the first rotation shaft 31 and each of the second rotation shafts 32 is rotated by the second conveyance drive unit 42. Further, at least one of the conveyance rotation shaft 33 and the upstream rotation shaft (not shown) which the plurality of string-shaped supports 23 forming the second component parts 22 are wound around and supported by is rotated by the second conveyance drive unit 42. Each of the first conveyance drive unit 41 and the second conveyance drive unit 42 may include one or more drive devices, and such drive devices may be configured by arbitrary power generators such as motors.

Each of the string-shaped supports 23 forming the first component part 21 is wound around and supported by each of the third rotation shaft 48 and a rotation shaft, which is not illustrated, in an arbitrary form in such a manner that its traveling position does not shift from the predetermined position in the width direction D2. Similarly, each of the string-shaped supports 23 forming the second component parts 22 is also wound around and supported by each of the upstream rotation shaft (not shown), the conveyance rotation shaft 33, and the first rotation shaft 31 and the second rotation shafts 32 in an arbitrary form in such a manner that its traveling position does not shift from the predetermined position. Typically, a plurality of grooves (not shown) are formed on each rotation shaft and corresponding string-shaped supports 23 are wound around and supported by the respective grooves, so that each string-shaped support 23 can travel while the displacement of each string-shaped support 23 is prevented.

In reality, each string-shaped support 23 travels while being supported by the corresponding rotation shafts under the effect of the tension acting on each string-shaped support 23, the traveling speed of each string-shaped support 23, and other influences. In particular, regarding the plurality of string-shaped supports 23 (the second component parts 22) wound around and supported by the first rotation shaft 31 and the second rotation shafts 32, the actual travel distance between the first rotation shaft 31 and the second rotation shafts 32, the actual travel direction, and the actual tension are not always the same among the string-shaped supports 23. Therefore, if the first rotation shaft 31 and the second rotation shafts 32 have a simple support structure, the string-shaped supports 23 easily fall off from the first rotation shaft 31 and/or the second rotation shafts 32. Actually, in devices prototyped by the inventors of the present invention, in a case where the second rotation shafts were configured by shafts in which a plurality of grooves were formed, each string-shaped support 23 fell off from a corresponding groove with the passage of time. Therefore, it is preferable that the second rotation shafts 32 should have a structure effective for preventing each string-shaped support 23 from falling off. As an example, the second rotation shafts 32 may have a plurality of winding parts (not shown), and the plurality of winding parts may be provided independently of each other and may support, without receiving substantial influences from each other, the corresponding plurality of string-shaped supports 23 while the plurality of string-shaped supports 23 can travel freely. The inventors of the present invention made the second rotation shafts 32 by alternately and repeatedly arranging two types of bearings having different diameters and inserting a shaft into these bearings, and the string-shaped supports 23 were wound around and supported by the respective bearings having a relatively smaller diameter. In this case, each bearing can rotate independently around the shaft without being affected by other bearings, and each string-shaped support 23 is arranged between bearings having a relatively larger diameter. When the bending mechanism 72 including the second rotation shafts 32 was operated, each of the string-shaped supports 23 could stably travel on a predetermined track for a long time without falling off from the second rotation shafts 32.

Also, a device which promotes the movement of a work W (that is, a skin 81 and an ingredient 82) from the bending mechanism 72 to the wrapping mechanism 73 is further provided. The device which transfers a work W from the bending mechanism 72 to the wrapping mechanism 73 can be configured by a general device, and the detailed description of a specific example thereof will be omitted. Such a device which transfers a work W from the bending mechanism 72 to the wrapping mechanism 73 may be driven under the control of the control unit 40 and may be controlled, for example, according to the detection results of the trigger sensor 37 illustrated in FIGS. 5 to 13.

[Bending Method]

Next, the entire flow of a method of raising the bending portions 87 by the bending mechanism 72 having the above-described configuration to bend a skin 81 will be described. The bending method described below is carried out under the control of the control unit 40 (see FIG. 14) and includes a step of conveying a skin 81 (i.e., a work W) by the conveyance unit 11 so as to pass through the second conveyance area A2 after passing through the first conveyance area A1.

Figure 8:
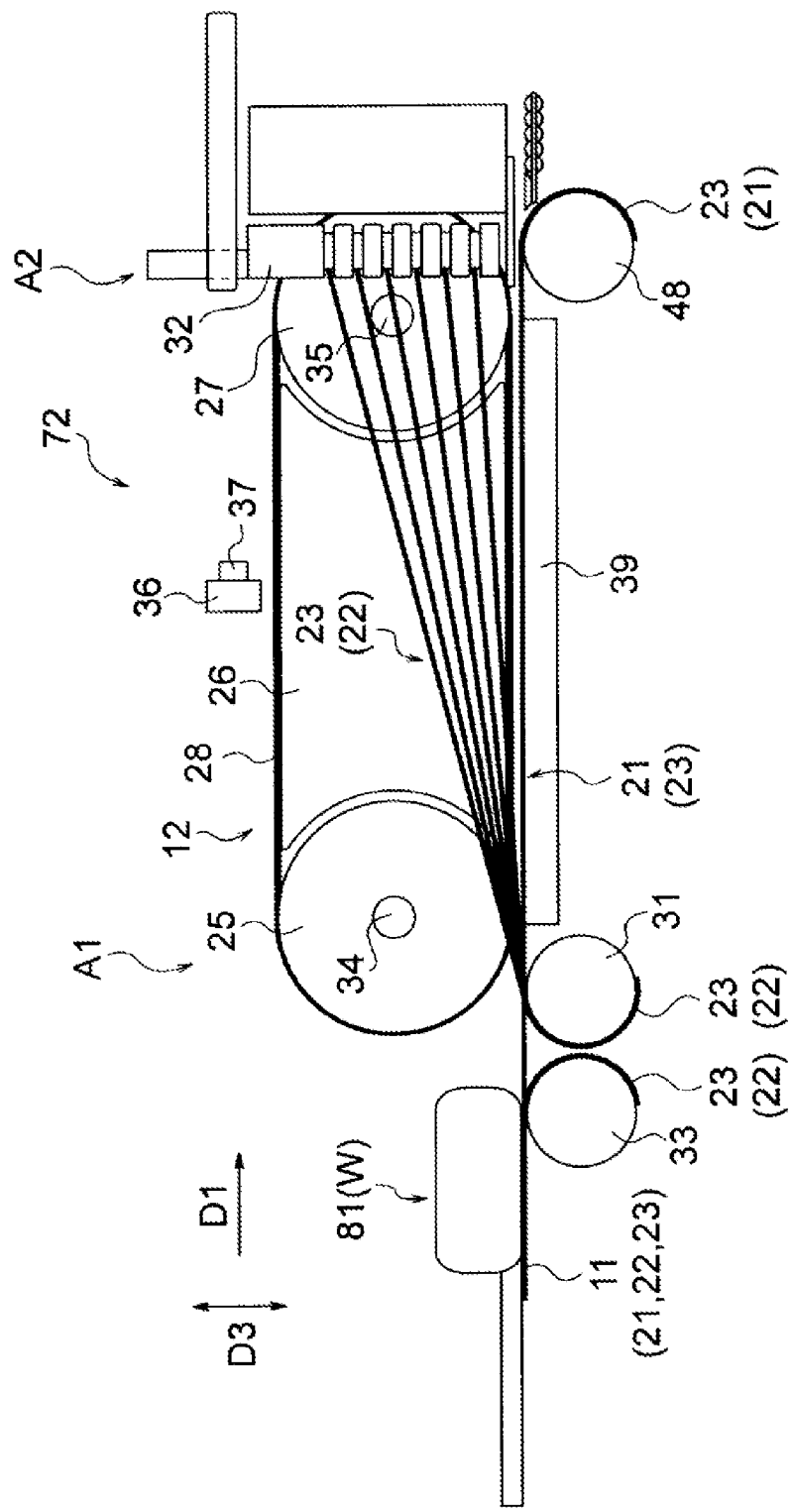
FIG. 8 is a side view of a bending mechanism.

Specifically, first, a work W (i.e., a skin 81 and an ingredient 82) is conveyed, by the conveyance unit 11, to a place which is located on the upstream side from the first conveyance area A1 (see FIGS. 5 and 8). At this stage, the bending reference portions 85 have been already given to the skin 81 by the bending reference portion formation mechanism 71 (see FIG. 4).

Figure 9:
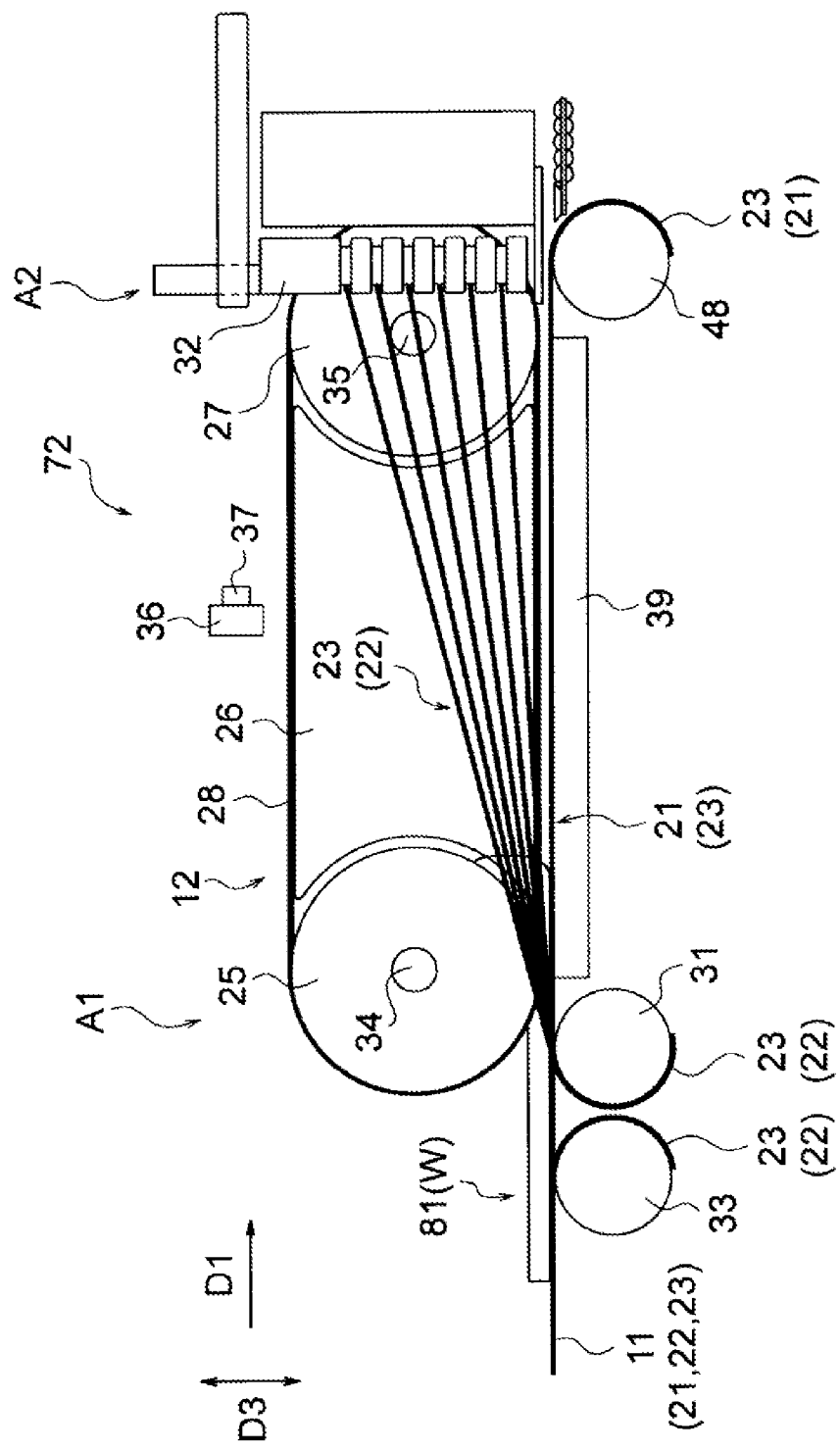
FIG. 9 is a side view of a bending mechanism.

Then, the work W is sent further downstream by the conveyance unit 11 and enters below the first support rollers 25 of the respective support units 12 (see FIG. 9). At this stage, the support moving bodies 28 wound around and supported by the respective first support rollers 25 come into contact with the corresponding bending reference portions 85 to slightly press the bending reference portions 85 (that is, the skin 81) against the conveyance unit 11 from above.

Figure 10:
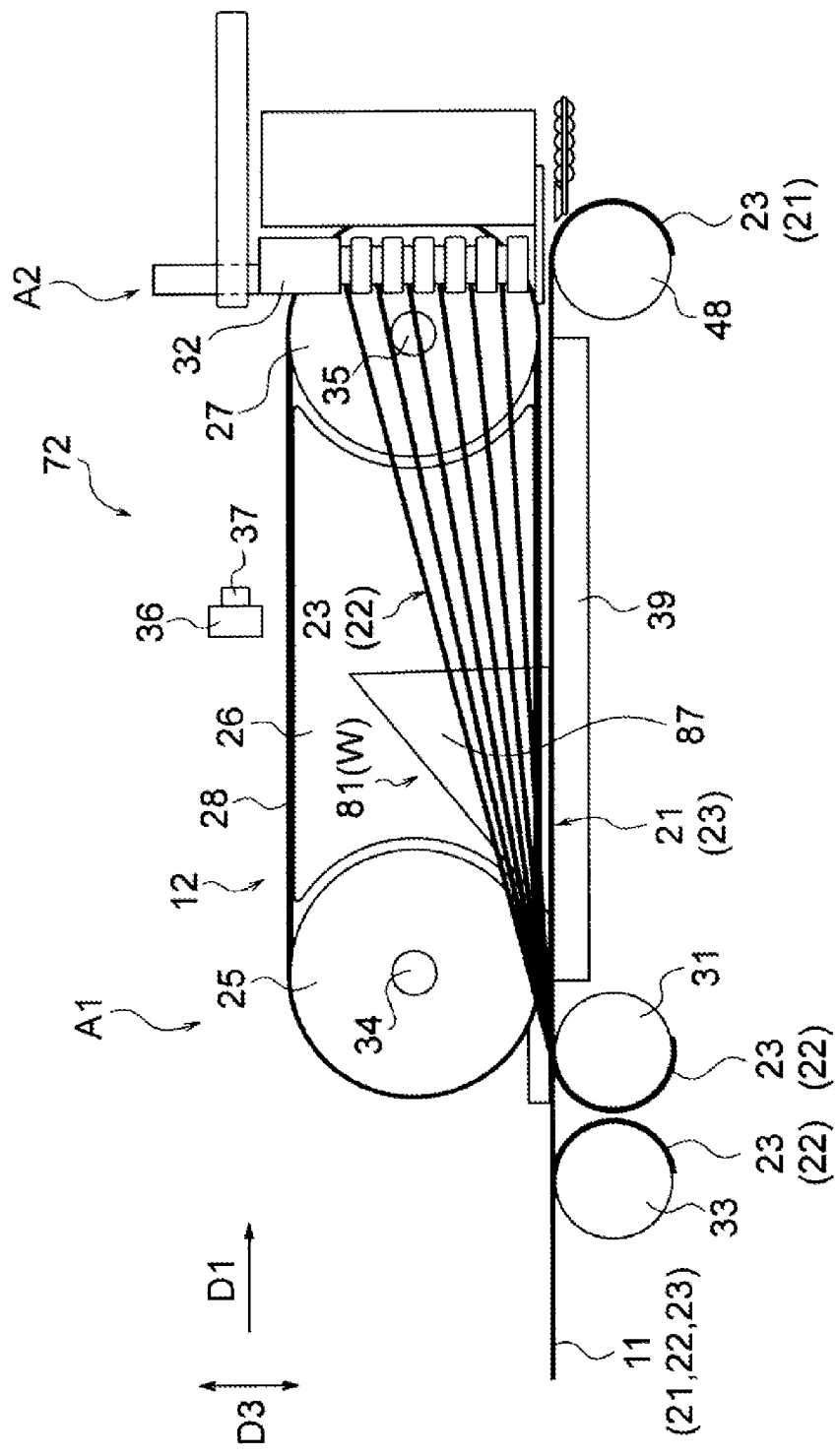
FIG. 10 is a side view of a bending mechanism.
Figure 11:
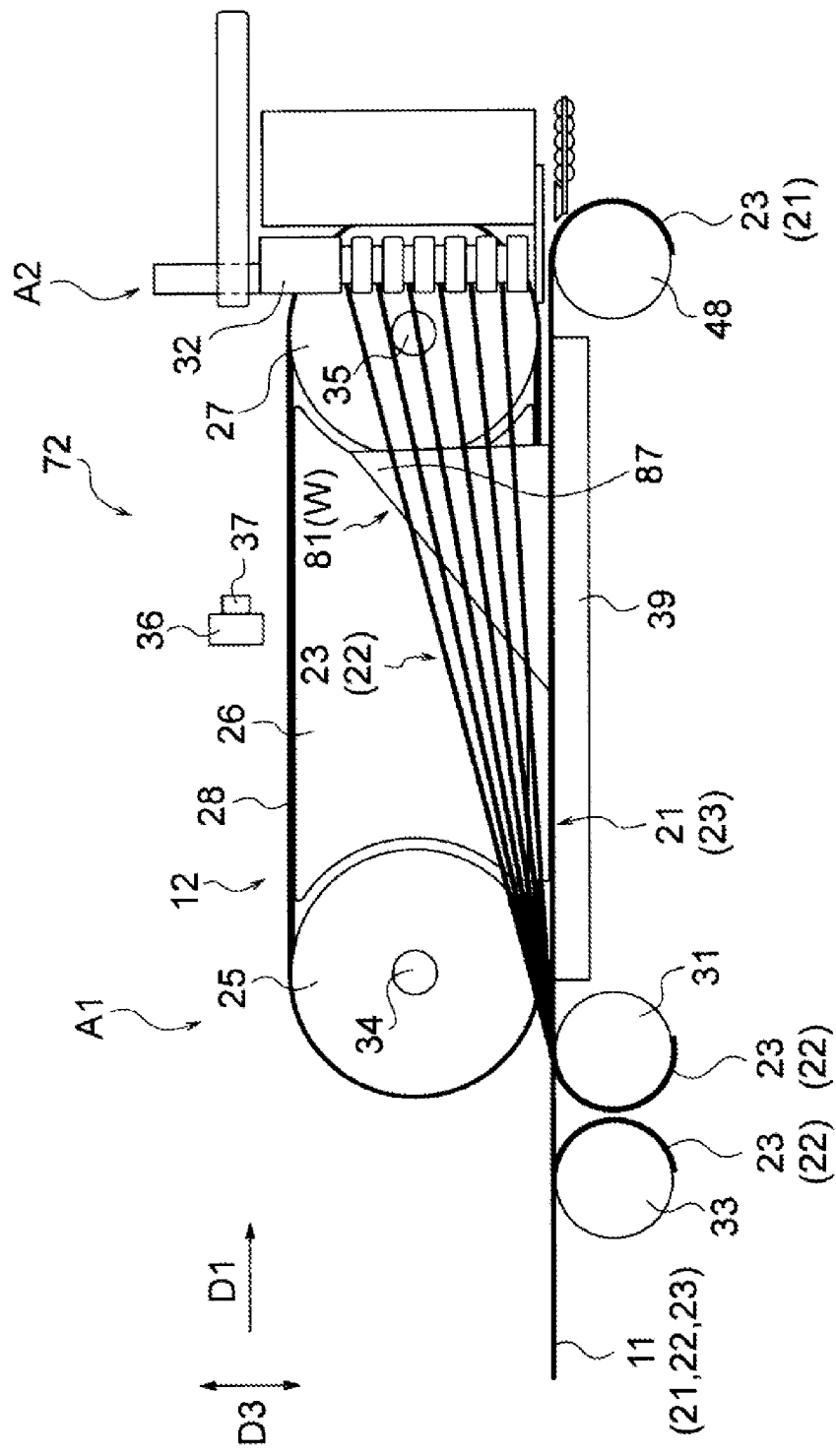
FIG. 11 is a side view of a bending mechanism.

Then, the work W is sent from the first conveyance area A1 toward the second conveyance area A2 as the string-shaped supports 23 and the support moving bodies 28 travel in the conveyance direction D1 (see FIGS. 6, 10 and 11). At this stage, the bending portions 87 of the skin 81 are gradually raised by the corresponding second component parts 22 in such a manner that the skin 81 is bent with reference to the bending reference portions 85. Further, when the work W passes through the detection position of the trigger sensor 37, the passage of the work W is detected by the trigger sensor 37 (see FIGS. 10 and 11).

Figure 12:
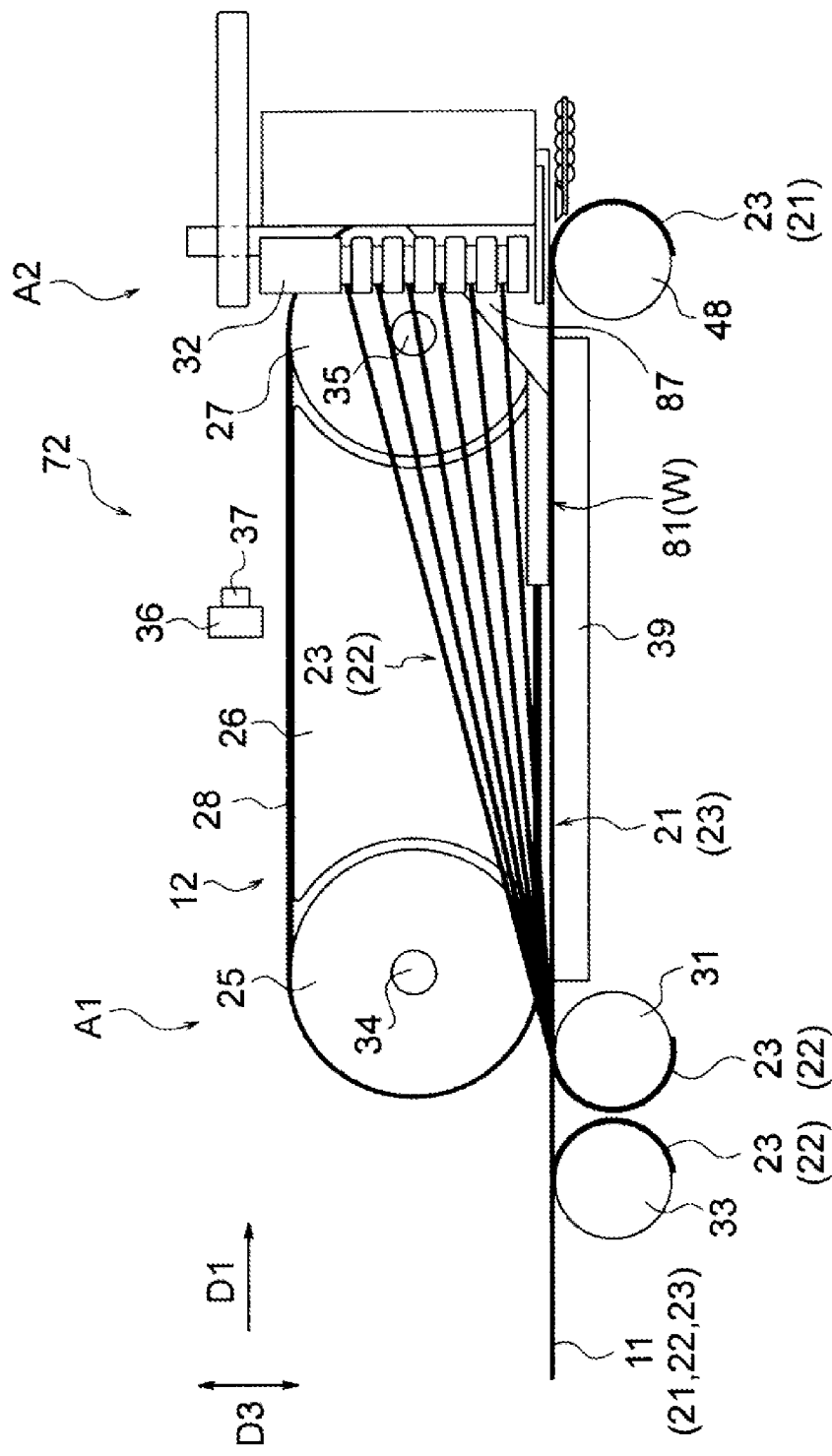
FIG. 12 is a side view of a bending mechanism.
Figure 13:
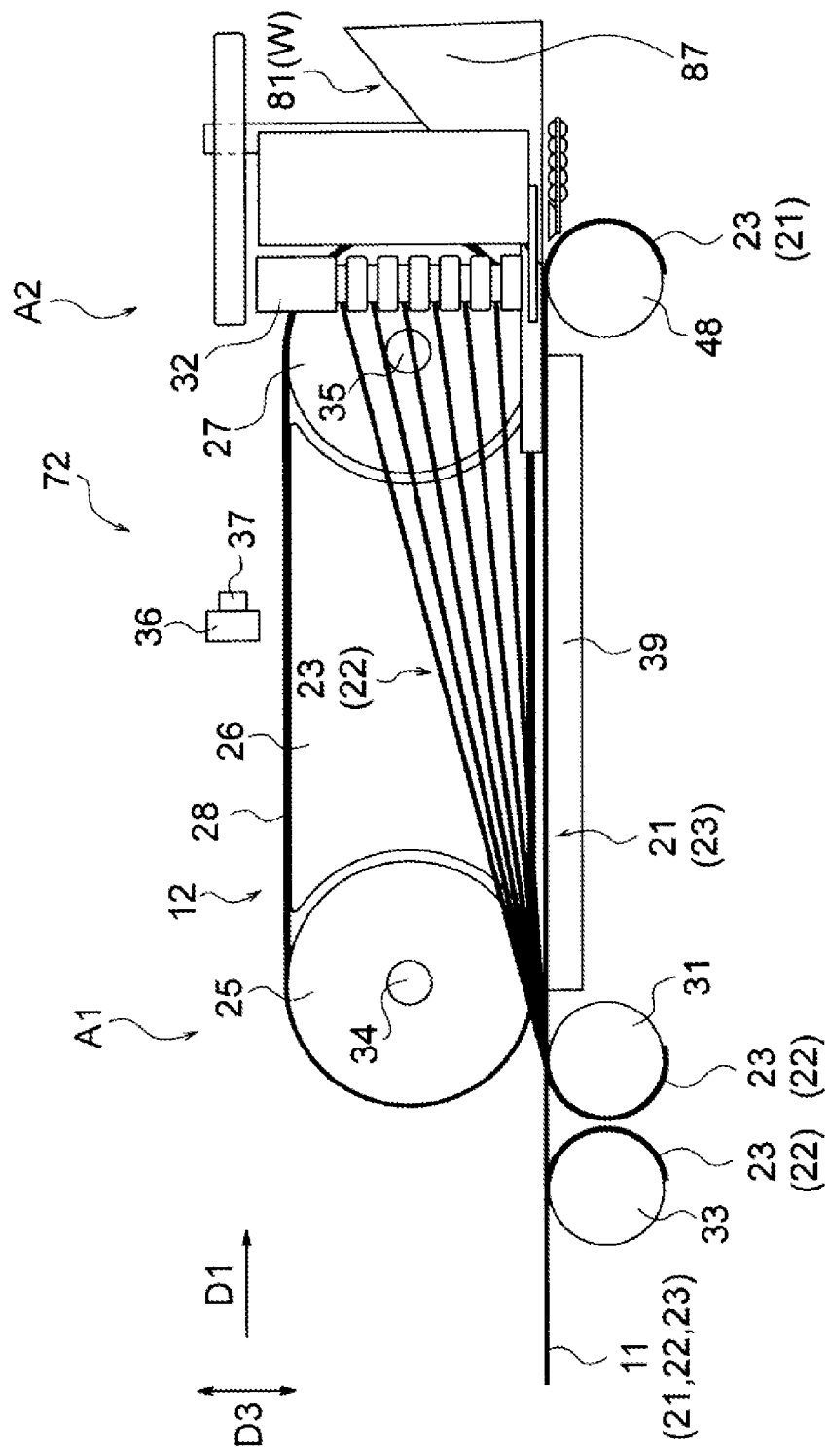
FIG. 13 is a side view of a bending mechanism.

Then, the work W is sent further downstream by the conveyance unit 11 and reaches the second conveyance area A2 (see FIGS. 7 and 12). The alignment direction of the plurality of string-shaped supports 23 forming the second component parts 22 at the position where the plurality of string-shaped supports 23 are wound around and supported by the second rotation shafts 32 is closest to the direction along the height direction D3. Therefore, at the position where the work W passes between the second rotation shafts 32, each bending portion 87 of the skin 81 extends generally in the height direction D3.

Then, the work W moved downstream from the second conveyance area A2 is sent to the wrapping mechanism 73 (see FIG. 4). Then, the skin 81 of the work W is folded by the wrapping mechanism 73, so that both end portions (that is, the two bending portions 87) of the skin 81 are placed on the ingredient 82 (see FIG. 1D).

As described above, according to the bending mechanism 72 and the bending method of the present embodiment, the bending portions 87 of a skin 81 can be raised reliably and stably, and the skin 81 can be bent with high accuracy and high speed. In particular, according to the bending mechanism 72 of the present embodiment, by moving the whole of a work W (i.e., a skin 81 and an ingredient 82) in the horizontal direction without moving the whole of the work W in the height direction D3, only the bending portions 87 of the skin 81 can be raised in the height direction D3. Therefore, a plurality of works W can be continuously conveyed at high speed and in a smooth manner, and it is possible to prevent an impact force from acting on the works W and keep the works W in a desired shape. Further, since the bending portions 87 are gradually raised as a skin 81 advances in the conveyance direction D1, the skin 81 can be reliably and neatly bent in a natural manner, and defects such as scratching of the bending portions 87 are unlikely to occur. As described above, according to the bending mechanism 72 of the present embodiment, by conveying a skin 81 from the first conveyance area A1 toward the second conveyance area A2, the bending portions 87 of the skin 81 are guided by the string-shaped supports 23 of the second component parts 22 so as to be naturally and smoothly raised in a passive manner. Further, a dedicated member and a dedicated power source for bending a skin, as used in the above-mentioned conventional device, are not required, and a skin 81 is not actively bent by such a dedicated member and therefore it is possible to prevent an excessively large force from acting on a skin 81 and bend a skin 81 appropriately and gently.

In contrast, in a device and a method where the whole of a work W needs to be moved in the height direction D3 in order to raise the bending portions 87 of the skin 81, the movement in the conveyance direction D1 of the work W is necessary to be stopped in order to move the work W in the height direction D3. Thus, the high-speed and smooth conveyance of a work W is hindered. Further, when a work W is moved in the height direction D3, a corresponding impact force is likely to act on the work W, and thus defects, such as displacement and shape loss of the skin 81, are likely to occur. Further, when a work W is moved in the height direction D3 to rapidly raise the bending portions 87 of the skin 81, the skin 81 might be torn or the bending portions 87 might be caught in the device. In particular, as the overall processing speed (for example, the conveyance speed of a work W) is increased, the occurrence of such defects tends to become more prominent.

Further, since the bending mechanism 72 of the present embodiment has a configuration which moves a work W in the horizontal direction only, the connectivity to other devices is excellent. Therefore, the bending mechanism 72 can be designed and installed relatively freely according to the installation mode of other devices provided on the upstream side and the downstream side, and the space-saving design of the bending mechanism 72 is also possible.

Further, the bending mechanism 72 of the present embodiment is able to address works W of various sizes and is excellent in versatility. For example, it is possible to use the same bending mechanism 72 for works W (in particular, skins 81) having a size of approximately 60 mm to 120 mm in the width direction D2.

APPLICATION EXAMPLES

The above-mentioned bending mechanism 72 and bending method can be applied to various food manufacturing apparatuses, food manufacturing systems and food manufacturing methods.

For example, skins used for burritos, tacos, crepes or other wrap foods (in other words, foods in which an ingredient is wrapped in a skin) can be suitably bent by the bending mechanism 72 and the bending method described above. The ingredients which can be placed on a skin are not limited, and the ingredients may include, for example, solid food materials, liquid food materials, viscous food materials (such as a special sauce called Tare in Japanese, sauce and cream), foaming food materials (such as whipped cream), and a mixture thereof. Further, an object other than the food materials may be placed on a skin, and for example, a solid tool, a sheet, a liquid material and a gel material which are not food materials may be placed on a skin. Moreover, a skin used for a food (for example, an egg roll) which contains only the skin and does not contain an ingredient can be also suitably bent by the above-mentioned bending mechanism 72 and bending method. In addition, sheet-shaped flexible food materials other than skins can be also suitably bent by the above-mentioned bending mechanism 72 and bending method. The components, the shapes and the sizes (specifically, the planar size and the thickness) of such sheet-shaped flexible food materials are not limited in particular. Further, sheet-shaped flexible food materials bent by the above-mentioned bending mechanism 72 and the bending method can be used in various food manufacturing apparatuses, food manufacturing systems and food manufacturing methods.

Figure 15:
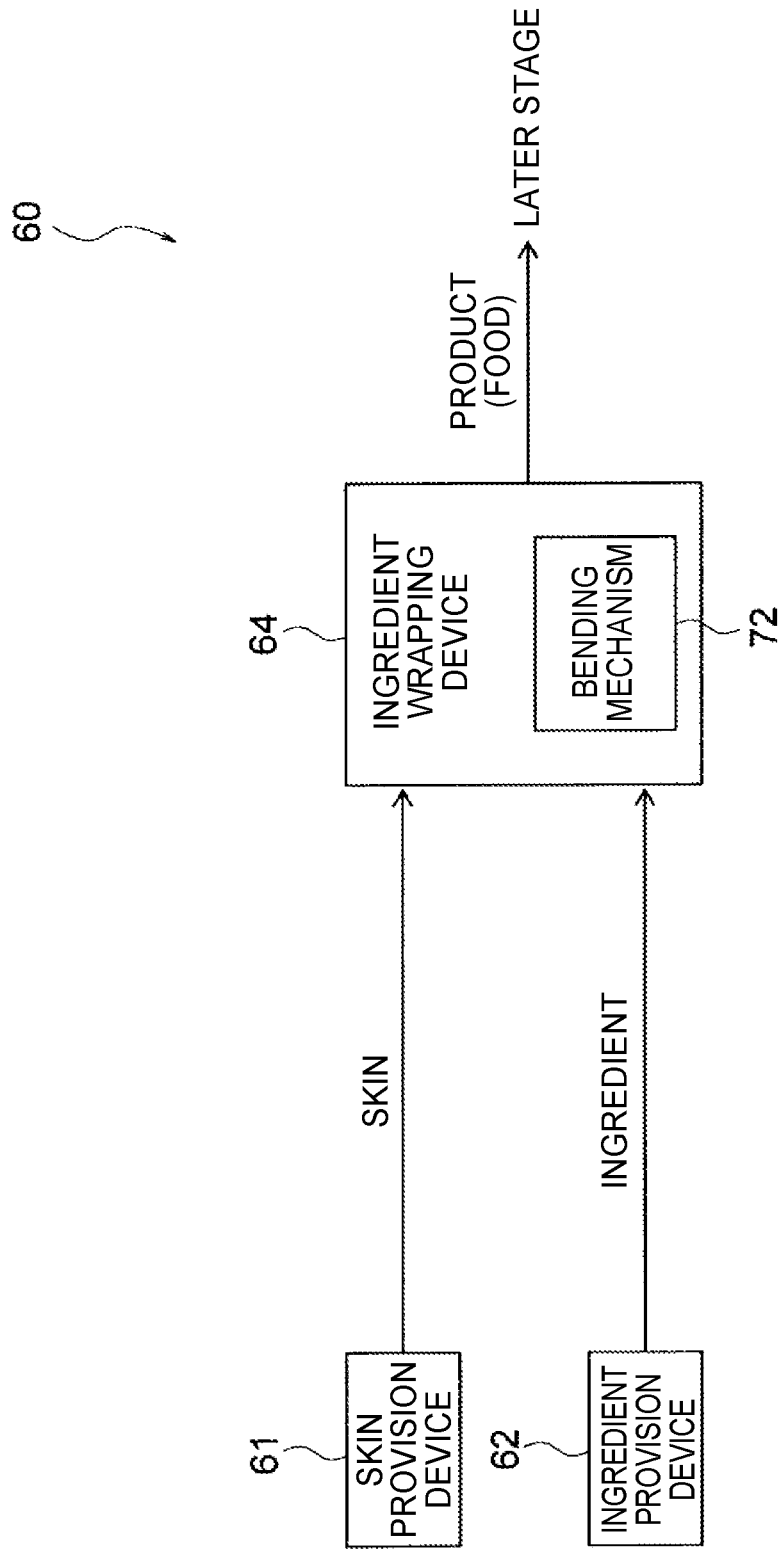
FIG. 15 is a block diagram showing an example of a food manufacturing system.

FIG. 15 is a block diagram showing an example of a food manufacturing system 60. The food manufacturing system 60 illustrated in FIG. 15 comprises a skin provision device 61 and an ingredient provision device 62 in addition to an ingredient wrapping device 64 including the bending mechanism 72 described above.

The skin provision device 61 is a device which prepares a skin for wrapping an ingredient, and a prepared skin is sent from the skin provision device 61 to the ingredient wrapping device 64 by a transportation device such as a conveyor. The specific configuration and function of the skin provision device 61 are not limited. For example, the skin provision device 61 may perform manufacturing and shaping (such as cutting) of a skin, may perform only shaping of a skin which is manufactured in advance, or may simply send a skin which is shaped in advance, in a desired state, toward the ingredient wrapping device 64. Further, the skin provision device 61 may perform other processes and, for example, may perform various pretreatments on a skin.

The ingredient provision device 62 is a device which prepares an ingredient (for example, a paste-like food material) to be wrapped in a skin, and a prepared ingredient is sent from the ingredient provision device 62 to the ingredient wrapping device 64 by a transportation device such as a conveyor. The specific configuration and function of the ingredient provision device 62 are not limited. For example, the ingredient provision device 62 may perform cutting and mixing of an ingredient, may only mix an ingredient that is cut in advance, or may simply send an ingredient which is mixed in advance, in a desired state, toward the ingredient wrapping device 64. Further, the ingredient provision device 62 may perform other processes and, for example, may perform various pretreatments on an ingredient.

The ingredient wrapping device 64 performs a process of wrapping a quantitated ingredient sent from the ingredient provision device 62 with a skin sent from the skin provision device 61 to manufacture a product (a food) (see FIGS. 1A to 1F). On this occasion, a skin is bent by the bending mechanism 72 by the above-mentioned bending method. The ingredient wrapping device 64 may comprise the above-mentioned bending reference portion formation mechanism 71 and the above-mentioned wrapping mechanism 73 (see FIG. 4). Then, a product (i.e., a food such as a spring roll 80 (see FIG. 1F)) produced by the ingredient wrapping device 64 is sent to a subsequent stage by a transportation device such as a conveyor, and various processes are performed in the subsequent stage as needed.

The food manufacturing system 60 illustrated in FIG. 15 is only an example, and in the food manufacturing system 60, any device may be combined with the bending mechanism 72 described above. Further, in the food manufacturing method, any process may be combined with the above-mentioned bending method. For example, in a food manufacturing system 60 and a food manufacturing method which manufacture a food which does not require an ingredient, the ingredient provision device 62 is unnecessary. Further, in cases where an ingredient is manually supplied directly to the ingredient wrapping device 64, the ingredient provision device 62 is unnecessary.

As described above, according to a food manufacturing system 60 comprising the bending mechanism 72 of the present embodiment, the bottleneck of the process which can be caused by the bending mechanism 72 can be improved, a large number of rolled foods can be continuously and stably manufactured at high speed and in a smooth manner, and the productivity can be improved.

Variant Examples

The present invention is not limited to the above-described embodiments and variant examples. For example, various modifications may be added to each element of the above-described embodiments and variant examples.

For example, each of the string-shaped supports 23 forming the conveyance unit 11 (in particular, the first component part 21) may extend in a direction inclined with respect to the horizontal direction, and the conveyance unit 11 may convey a work W in a direction inclined with respect to the horizontal direction (in particular, in a direction including both a horizontal direction component and a height direction component).

Further, each second rotation shaft 32 may extend in a direction inclined with respect to the height direction D3.

Further, the cross-sectional size and cross-sectional shape of each string-shaped support 23 (in particular, each string-shaped support 23 of the second component parts 22 which support the bending portions 87 of a skin 81 when a work W is conveyed from the first conveyance area A1 toward the second conveyance area A2) are not limited, and each string-shaped support 23 can have a circular cross section or a non-circular cross section.

Further, each of the string-shaped supports 23 included in the first component part 21 and/or each of the string-shaped supports 23 included in the second component parts 22 may stop while a work W is being conveyed. Specifically, a propulsive force may be applied to a work W by only one of the first component part 21 and the second component parts 22 to convey the work W in the conveyance direction D1, or a propulsive force may be applied to a work W by another transportation device, which is not illustrated, instead of the first component part 21 and the second component parts 22 or in addition to the first component part 21 and/or the second component parts 22, to convey the work W in the conveyance direction D1. In a case where the first component part 21 and/or the second component parts 22 stop while a work W is conveyed, the stopped first component part 21 and/or the stopped second component parts 22 function as a guide unit which guides the work W.

Further, the bending mechanism 72 does not necessarily have to be combined with the bending reference portion formation mechanism 71 and/or the wrapping mechanism 73 (see FIG. 4), may be combined with another device, or may be used alone.

In addition, embodiments comprising components and/or methods other than the above-mentioned components and/or methods are also included in the embodiments of the present invention. Further, embodiments which do not comprise a part of the above-mentioned components and/or methods are also included in the embodiments of the present invention. Moreover, embodiments comprising some components and/or methods included in certain embodiments of the present invention and some components and/or methods included in other embodiments of the present invention are also included in the embodiments of the present invention. Therefore, components and/or methods included in the above-described embodiments, the above-described variant examples, and embodiments of the present invention which are not described above may be combined with each other, and embodiments related to such combinations are also included in the embodiments of the present invention. Further, the effects produced by the present invention is not limited to the above-mentioned effects, and a particular effect according to the specific configuration of each embodiment can be exhibited. As described above, various additions, modifications and partial deletions may be made to each element described in the claims, the specification, the abstract and the drawings without departing from the technical idea and purpose of the present invention.

REFERENCE SIGNS LIST

11 Conveyance unit
12 Support unit
21 First component part
22 Second component part
23 String-shaped support
25 First support roller
26 Relay guide unit
27 Second support roller
28 Support moving body
31 First rotation shaft
32 Second rotation shaft
33 Conveyance rotation shaft
34 First support shaft
35 Second support shaft
36 Third support shaft
37 Trigger sensor
38 Sensors
39 Moving body guide
40 Control unit
41 First conveyance drive unit
42 Second conveyance drive unit
48 Third rotation shaft
60 Food manufacturing system
61 Skin provision device
62 Ingredient provision device
64 Ingredient wrapping device
71 Bending reference portion formation mechanism
72 Bending mechanism
73 Wrapping mechanism
80 Spring roll
81 Skin
82 Ingredient
85 Bending reference portion
86 Base portion
87 Bending portion
A1 First conveyance area A2 Second conveyance area
C1 First vertex
C2 Second vertex
C3 Third vertex
C4 Fourth vertex
D1 Conveyance direction
D2 Width direction
D3 Height direction
S1 Preparation step
S2 First folding step
S3 Second folding step
S4 Third folding/fourth folding step
S5 Fifth folding step
S6 Sixth folding step
S11 Bending reference portion formation step
S12 Bending step
S13 Wrapping step
W Work

The invention claimed is:

1. A bending mechanism which bends a sheet-shaped flexible food material, the bending mechanism comprising:
a conveyance unit which conveys the flexible food material in such a manner that the flexible food material passes through a second conveyance area after passing through a first conveyance area; and
a support unit which supports a bending reference portion being a part of the flexible food material, in at least a part of a section while the flexible food material is conveyed from the first conveyance area to the second conveyance area,
wherein the conveyance unit includes: a first component part which supports a base portion of the flexible food material positioned on one side with reference to the bending reference portion; and a second component part which supports a bending portion of the flexible food material positioned on another side with reference to the bending reference portion, and
wherein an angle formed by a support portion of the second component part which makes contact with the bending portion with respect to a support portion of the first component part which makes contact with the base portion continuously changes from the first conveyance area toward the second conveyance area in such a manner that an angle of the bending portion with respect to the base portion in the second conveyance area is larger than an angle of the bending portion with respect to the base portion in the first conveyance area,
wherein the second component part, which supports the bending portion while the flexible food material is conveyed from the first conveyance area to the second conveyance area, includes a plurality of string-shaped supports,
wherein the support portion of the second component part is formed by portions of the plurality of string-shaped supports which make contact with the flexible food material,
wherein arrangement of the plurality of string-shaped supports in each of the first conveyance area and the second conveyance area is adjusted in such a manner that the angle formed by the support portion of the second component part with respect to the support portion of the first component part continuously changes from the first conveyance area toward the second conveyance area,
wherein the plurality of string-shaped supports are wound around and supported by a first rotation shaft and a second rotation shaft,
wherein an alignment direction of portions of the plurality of string-shaped supports wound around and supported by the first rotation shaft is different from an alignment direction of the plurality of string-shaped supports wound around and supported by the second rotation shaft,
wherein the first rotation shaft extends along a horizontal direction,
wherein the second rotation shaft extends in a direction which is not along a horizontal direction,
wherein the plurality of string-shaped supports are arranged in such a manner that a string-shaped support arranged farther in a horizontal direction from the bending reference portion in the first conveyance area is arranged at a higher position in a height direction in the second conveyance area, and
wherein the support unit includes a support moving body which travels from the first conveyance area toward the second conveyance area while being in contact with the bending reference portion.

2. The bending mechanism as defined in claim 1, wherein:
the support unit further includes a first support roller and a second support roller which the support moving body is wound around and supported by, and
the support moving body travels in accordance with axial rotation of each of the first support roller and the second support roller.

3. The bending mechanism as defined in claim 1, wherein:
the first conveyance area and the second conveyance area are separated in a horizontal direction from each other, and
an angle formed by the bending portion with respect to a horizontal plane in the second conveyance area is larger than an angle formed by the bending portion with respect to the horizontal plane in the first conveyance area.

4. The bending mechanism as defined in claim 1, wherein:
the two second component parts are provided in such a manner that the first component part is arranged between the two second component parts,
the two support units are provided, the two support units respectively supporting the bending reference portions existing at two locations of the flexible food material, and
the flexible food material has the two bending portions arranged in such a manner that the base portion is arranged between the two bending portions.

5. The bending mechanism as defined in claim 1, wherein:
the support unit further includes a first support roller and a second support roller which the support moving body is wound around and supported by, and
the support moving body travels in accordance with axial rotation of each of the first support roller and the second support roller while being in contact with the bending reference portion between the first support roller and the second support roller.

* * * * *